US006367737B1

(12) United States Patent
Lohse et al.

(10) Patent No.: US 6,367,737 B1
(45) Date of Patent: Apr. 9, 2002

(54) AMPHIBIOUS AIRCRAFT

(76) Inventors: James R. Lohse, 1416 Van Wyck Rd., Bellingham, WA (US) 98226; James G. Hutton, 7329 - 128th Ave. NE., Kirkland, WA (US) 98033

( * ) Notice: Subject to any disclaimer, the term of this patent is extended or adjusted under 35 U.S.C. 154(b) by 0 days.

(21) Appl. No.: 09/454,716

(22) Filed: Dec. 6, 1999

Related U.S. Application Data

(63) Continuation of application No. 08/802,950, filed on Feb. 21, 1997.
(60) Provisional application No. 60/012,072, filed on Feb. 22, 1996.

(51) Int. Cl.⁷ .............................................. B64C 35/00
(52) U.S. Cl. ........................... 244/13; 244/55; 244/106
(58) Field of Search ............................. 244/13, 55, 65, 244/105, 106, 50, 12.1, 36, 14, 25, 199, 45 R, 45 A

(56) References Cited

U.S. PATENT DOCUMENTS

| 1,353,955 A | * | 9/1920 | Hering | |
|---|---|---|---|---|
| 1,527,673 A | * | 2/1925 | Dornier | |
| 1,692,010 A | * | 11/1928 | Wait, Jr. | |
| 1,757,687 A | * | 5/1930 | Silva, Jr. | |
| 1,765,328 A | * | 6/1930 | Fokker et al. | |
| 1,852,691 A | * | 4/1932 | Beilgard | |
| 1,874,570 A | * | 8/1932 | Minshall | |
| 1,890,553 A | * | 12/1932 | Young | |
| 1,943,774 A | * | 1/1934 | Shaw | 244/14 |
| 2,005,728 A | * | 6/1935 | Burgess | 244/25 |
| 2,110,865 A | * | 3/1938 | Burgess | |
| 2,118,254 A | * | 5/1938 | Loedding | 244/36 |
| 2,147,795 A | * | 2/1939 | Martin | 244/106 |
| 2,194,596 A | * | 3/1940 | Henter | 244/13 |
| 2,359,652 A | * | 10/1944 | Larsen | 244/55 |
| 2,392,439 A | * | 1/1946 | Wallace | 244/50 |
| 2,476,482 A | * | 7/1949 | Custer | 244/12 |
| 2,499,350 A | * | 3/1950 | Bennett et al. | 244/101 |
| 2,510,959 A | * | 6/1950 | Custer | 244/12 |
| 2,514,478 A | * | 7/1950 | Custer | 244/12 |
| 2,893,661 A | * | 7/1959 | Aylor | 244/36 |
| 2,994,493 A | * | 8/1961 | Hartman | 244/36 |
| 3,078,062 A | * | 2/1963 | Fischer | 244/65 |
| 3,081,965 A | * | 3/1963 | Shew | 244/12 |
| 3,216,673 A | * | 11/1965 | Alter et al. | 244/12 |
| 3,259,342 A | * | 7/1966 | Kessery | 244/45 |

(List continued on next page.)

FOREIGN PATENT DOCUMENTS

| FR | 459438 | * 11/1913 |
|---|---|---|
| FR | 717054 | * 12/1931 |

*Primary Examiner*—Galen L. Barefoot
(74) *Attorney, Agent, or Firm*—Robert B. Hughes; Hughes Law Firm, PLLC

(57) ABSTRACT

An amphibious airplane having an engine assembly mounted at a top center location in the fuselage, and a tail assembly having a horizontal fin in an elevated position so as to be in the propeller air stream. A lift augmenting aerodynamic surface is positioned at the top middle portion of the aircraft fuselage, with the propeller being at the concavely curved rear end of the lift augmenting surface. A pair of platforms are positioned on opposite sides of the fuselage at lower locations adjacent to a passenger section of the aircraft. These platforms are aerodynamically aligned and also have strakes extending forwardly therefrom along opposite sides of the fuselage. In cruise mode, the increased velocity imparted to the propeller air stream acts on the horizontal fin to exert a downward force, with the various forces of the airplane balancing each other. With increased power setting of the engine, the increased velocity of the propeller air stream enables the horizontal tail fin to exert a greater downward force to maintain stable operation of the aircraft.

24 Claims, 15 Drawing Sheets

U.S. PATENT DOCUMENTS

| | | | |
|---|---|---|---|
| 3,599,903 A | * | 8/1971 | Handler |
| 3,608,850 A | * | 9/1971 | Fredericks .................... 244/36 |
| 3,614,032 A | * | 10/1971 | Purcell, Jr. .................... 244/36 |
| 3,652,035 A | * | 3/1972 | Fredericks ............ 244/12 CW |
| 3,981,460 A | * | 9/1976 | Ratony ........................ 244/13 |
| 4,030,688 A | * | 6/1977 | Pellarini ...................... 244/36 |
| 4,691,881 A | * | 9/1987 | Gioia .......................... 244/106 |
| 4,739,957 A | * | 4/1988 | Vess et al. ................... 244/199 |
| 4,795,308 A | * | 1/1989 | Fischer et al. |
| 4,962,978 A | * | 10/1990 | Weston |
| 5,082,204 A | * | 1/1992 | Croston |

* cited by examiner

AIRCRAFT IN DOCKED POSITION WITH OPEN COCKPIT

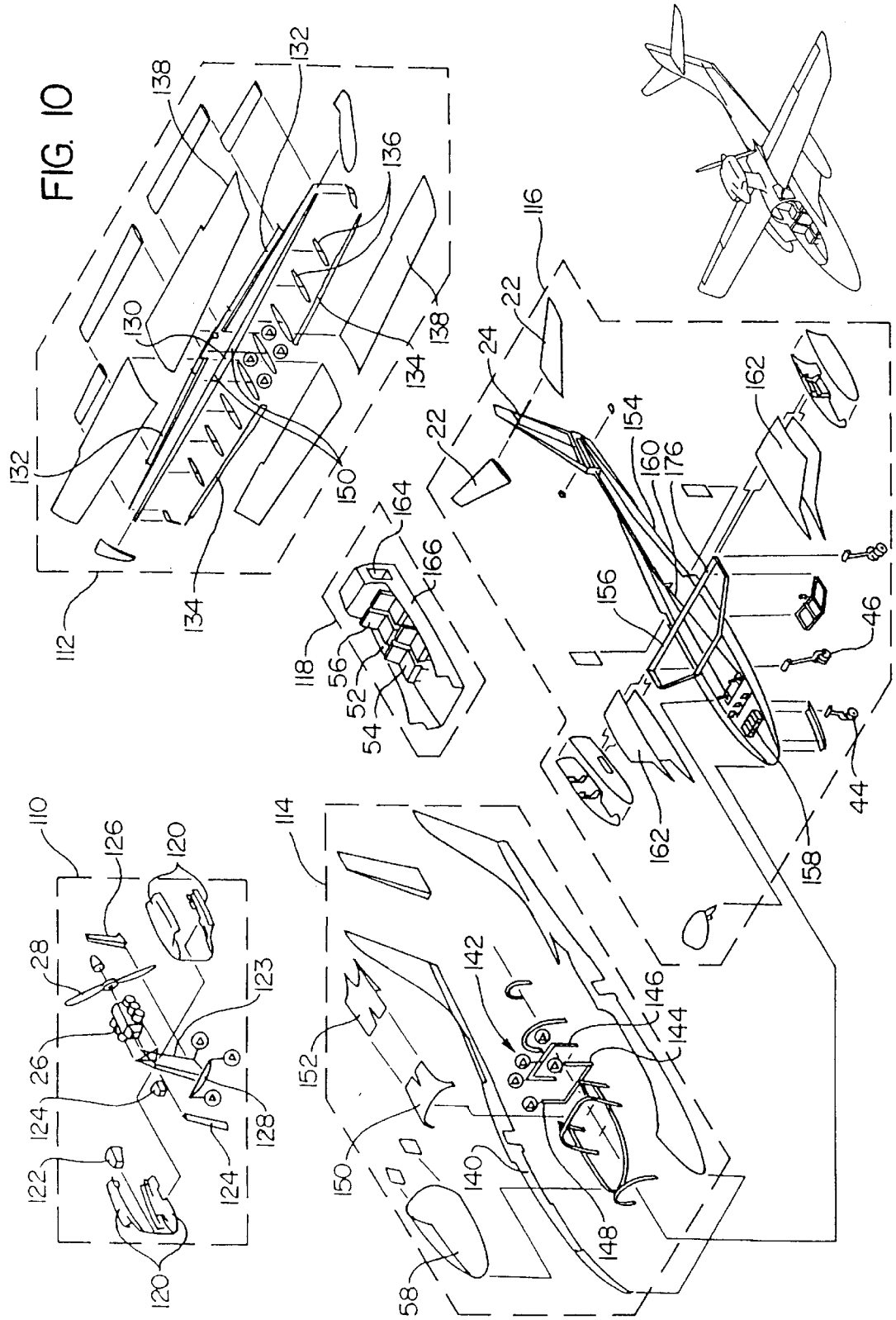

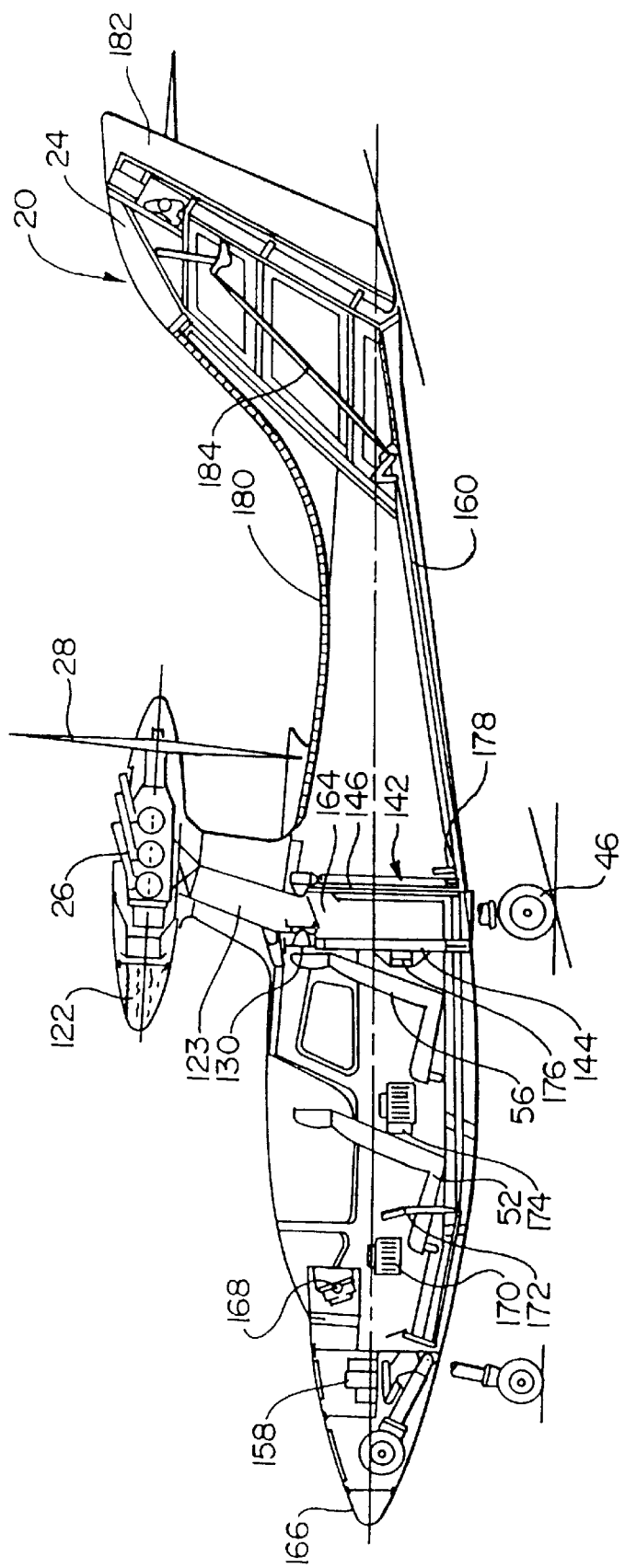

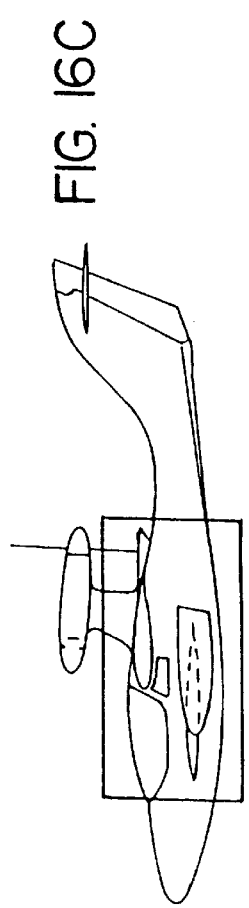
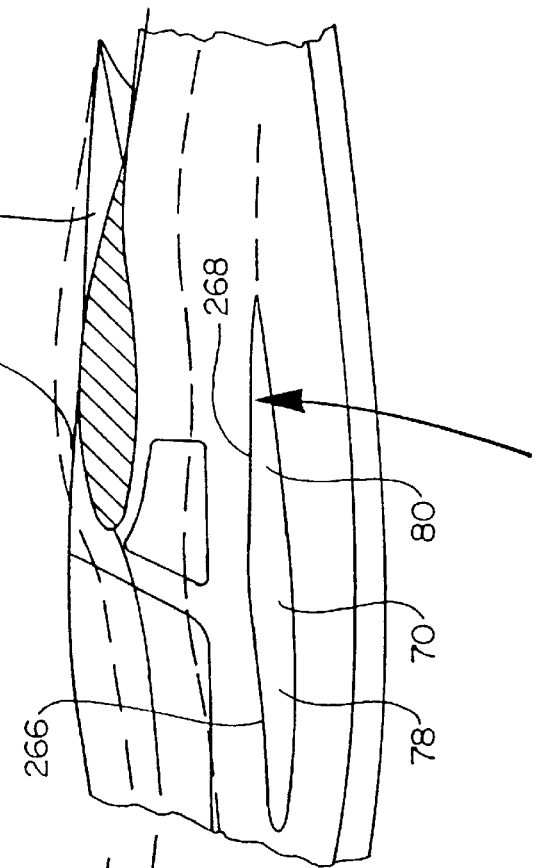
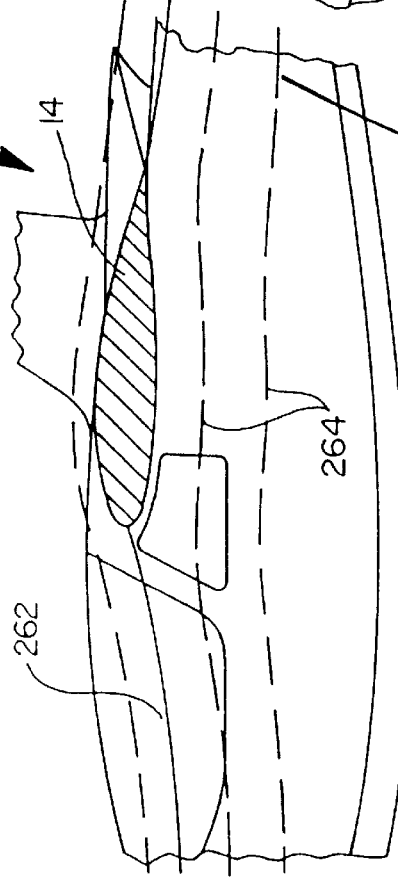
FIG. 16C
FIG. 16B
FIG. 16A

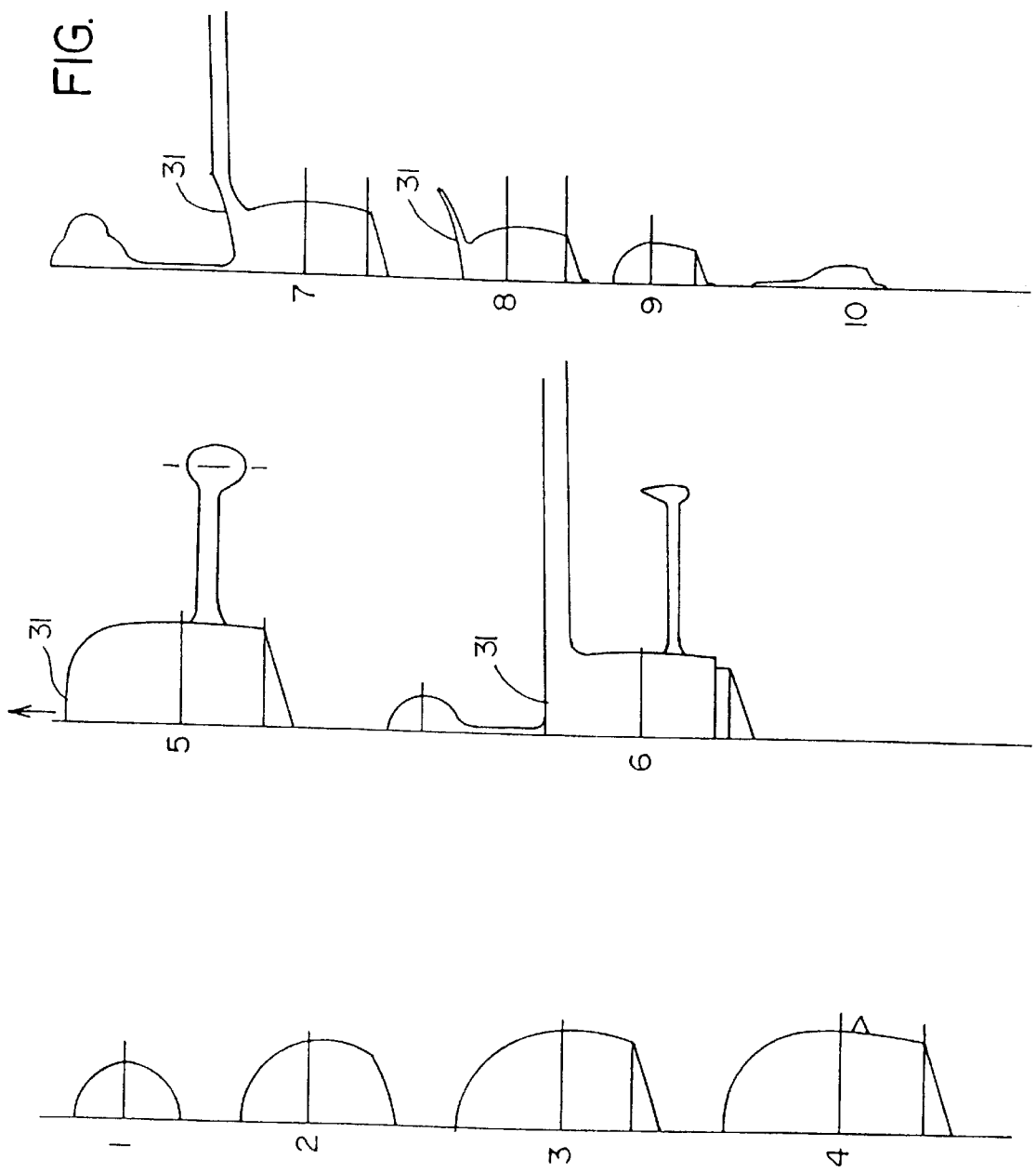

AMPHIBIOUS AIRCRAFT

This application is a continuation of 08/802,950 filed Feb. 21, 1997 and claims the benefit of 60/012,072 filed Feb. 22, 1996.

BACKGROUND OF THE INVENTION a) Field of the Invention

The present invention relates to the coniguration of an amphibious aircraft which optomizes ergonomic, aerodynamic and hydrodynamic features. These features are designed to provide economic benefits with regard to inital cost, and operation cost without sacrifice in safety.

b) Background of the Invention

In general, the amphibious aircraft is more complex than its land based counterparts due to the dual mission. Water landing requires the aircraft to be engineered to be water tight and withstand the added stress of water impact and docking. The propeller must be protected from the spray. The aircraft must have a safe method for boarding on both land and water. Desirably the aircraft would be designed so as to be able to use a standard boat dock and thus avoid the extra expense of building a special boarding facility. It also is desirable that the aircraft complexity does not degrade aerodynamic performance when compared to comparably sized land based planes.

These design objectives must be met in such a manner that the aircraft is stable on the water, on land and in air. Further, there is the consideration of designing the aircraft so that it is convenient and safe for the pilot and passengers, and yet is integrated so that the various aerodynamic, structural and design features blend together to provide an overall practical, efficient and economical aircraft.

There have been various attempts in the prior art to augment lift by channelling the slipstream created by the propeller. Various portions at the wing or fuselage have been contoured to accomplish this. All of these devices have unfortunately resulted in degradation of cruise performance to the best knowledge at the application.

SUMMARY OF THE INVENTION

The present invention comprises an airplane design, and also a method of operating of the airplane. In the preferred form of the present invention, as described herein, the airplane is desirably a seaplane, and more specifically in the test is described as an amphibious airplane. Yet, within the broader scope of the present invention, features of the present invention could be incorporated in an airplane which is not a seaplane.

The airplane of the present invention comprises a fuselage having a longitudinal axis, a vertical axis, a lateral axis perpendicular to the longitudinal and vertical axes, a front end portion, a rear end portion, and a main fuselage portion between the front and rear end portions.

There is a main wing mounted to an upper part of the fuselage main portion, extending generally laterally therefrom as right and left wing sections.

An engine assembly is mounted above the fuselage main body portion and spaced upwardly therefrom. The engine assembly has a propeller means which defines a propeller area through which the propeller rotates. The propeller creates a rearwardly traveling propeller flow stream.

There is a tail means located at a rear portion of the fuselage. This tail means has an aerodynamic surface means to create a vertically aligned aerodynamic force component. The tail means is located rearwardly of the propeller and in the propeller flow stream.

There is a longitudinally extending aerodynamic lift augmenting surface means located over the fuselage main body portion, and this provides an upwardly facing aerodynamic lift augmenting surface longitudinally aligned with the propeller flow stream so that at least a portion of the propeller flow stream flows over the lift augmenting surface means to create augmented lift.

The lift augmenting surface means has a number of unique advantages. First, it is supported by the aircraft "strong box" which is the main structural support in the fuselage of the airplane. The engine assembly is mounted at this location, as is the lift augmenting surface means. Thus, this alleviates construction costs and potential fatigue problems.

The lift augmenting surface is aligned substantially horizontally to optimize lift, minimize drag and improve airplane performance in cruise operation. Further, since the lift forces created by the lift augmenting surface means are related to the velocity of the propeller air stream, as the thrust of the propeller increases, the ability of the tail means to exert a downward aerodynamic force to maintain the stability of the airplane is enhanced.

In the preferred configuration, the lift augmenting surface means has in transverse cross section a concavely curved surface portion, and the propeller is located adjacent to this concavely curved surface portion, with the path of the propeller and the curvature of the surface portion being concentric and these also placed closed adjacent to one another.

In the preferred form, the lift augmenting surface means has a center of lift positioned forwardly at the propeller means. Also, desirably the concavely curved surface portion has an arcuate length between about a right angle and one half of a right angle, with a presently preferred configuration having the arcuate length of about 70°. Also, desirably, the lift augmenting surface means is substantially horizontally aligned. For design balance, there may be a slight downward and rearward slope, but this should be no greater than a fourteen to one slope, since a greater slope would unnecessarily create an aerodynamic force component that would increase drag. Also, in the preferred form, the engine assembly comprises a push engine which is mounted above the lift augmenting surface means, and also desirably mounted by a strut from the main central structural box of the airplane.

In the preferred form, the airplane is adapted to takeoff from, and land on, a water surface. The fuselage has a passenger section with an access location by which a pilot and/or passengers can move into and out of the passenger section. The airplane comprises substantially horizontally aligned platform means extending laterally from the fuselage adjacent to the access location. More specifically, there are right and left platforms on opposite sides of the fuselage, and each platform comprises a main platform portion and a strake having a highly swept leading edge extending from its related main platform portion forwardly along the fuselage.

In the preferred form, each of the platforms has a forward platform portion and a rear platform portion. The forward platform portion is positioned forwardly of a leading edge of the main wing, and the rear platform portion is positioned longitudinally behind the leading edge of the main wing. At least the rear main platform portion is aerodynamically aligned so as to alleviate possible aerodynamic interference with air stream flow around the main wing.

The strakes are both arranged to generate at higher angles of attack a vortex which travels over the main platform portion to create vortex generated lift. The main wing is characterized in that at a predetermined angle of attack of the airplane, the main wing reaches an initial stalling condition. Each strake is aerodynamically arranged to continue generating a strong vortex flow over its main platform portion at the predetermined angle of attack to generate vortex induced lift to alleviate an initial stall condition of the main wing.

The airplane has an airplane reference mean aerodynamic chord (MAC) and also a quarter chord (mean aerodynamic chord) point. Components of the airplane are, for purposes of definition, considered as having a percentage distance forwardly or rearwardly of the airplane reference quarter chord MAC point, with distance being measured as a percentage value where one hundred percent is the length of the airplane reference mean aerodynamic chord.

Various components of the airplane are located within ranges in accordance with this reference point and reference distance.

The center of gravity of the airplane should be no greater than fifty percent forward of the quarter chord MAC point and no greater than greater than twenty five percent rearwardly of the chord MAC point. Also, this center of gravity should be forward of the center of lift of the airplane. Desirably it should be at least thirty three percent forward of the quarter chord MAC point.

The augmenting lift surface has a center of lift, and this is optimally located at about seventy five percent rearwardly of the quarter chord MAC point, and within a broader range is between zero to one hundred and twenty five percent rearwardly of the chord to chord MAC points.

In the passenger section, there is passenger seat means which is positioned desirably at a location at the center of gravity of the airplane. Within broader limits this passenger seat means should be positioned within fifty percent of the center of gravity of the airplane. Thus, passengers being seated at the passenger seat means does not significantly affect the location of the center of gravity.

With regard to the location of the two strakes, the forward end of each strake should be between about one hundred percent to two hundred fifty percent forward of the reference chord MAC point. The leading edge of the main platform is desirably located about fifty percent to one hundred fifty percent forward of the reference quarter MAC point.

There are other relationships of the aerodynamic features, force components and moments which are significant in the present invention. These and other features of the present invention will become apparent from the following detailed description.

BRIEF DESCRIPTION OF THE DRAWINGS

FIG. 10 is an isometric exploded view showing various components of the present invention;

FIG. 11 is a side elevational view of the airplane, showing forward portions of the fuselage and the engine nacelle removed for purposes of illustration;

FIGS. 16A, 16B, and 16C are side elevational views, showing aerodynamic relationships of the main wing and the platform;

FIG. 17B is a series of ten cross sectional views showing the cross section at the locations indicated in FIG. 17A.

DESCRIPTION OF THE PREFERRED EMBODIMENT

A. Introduction

Figure 1:
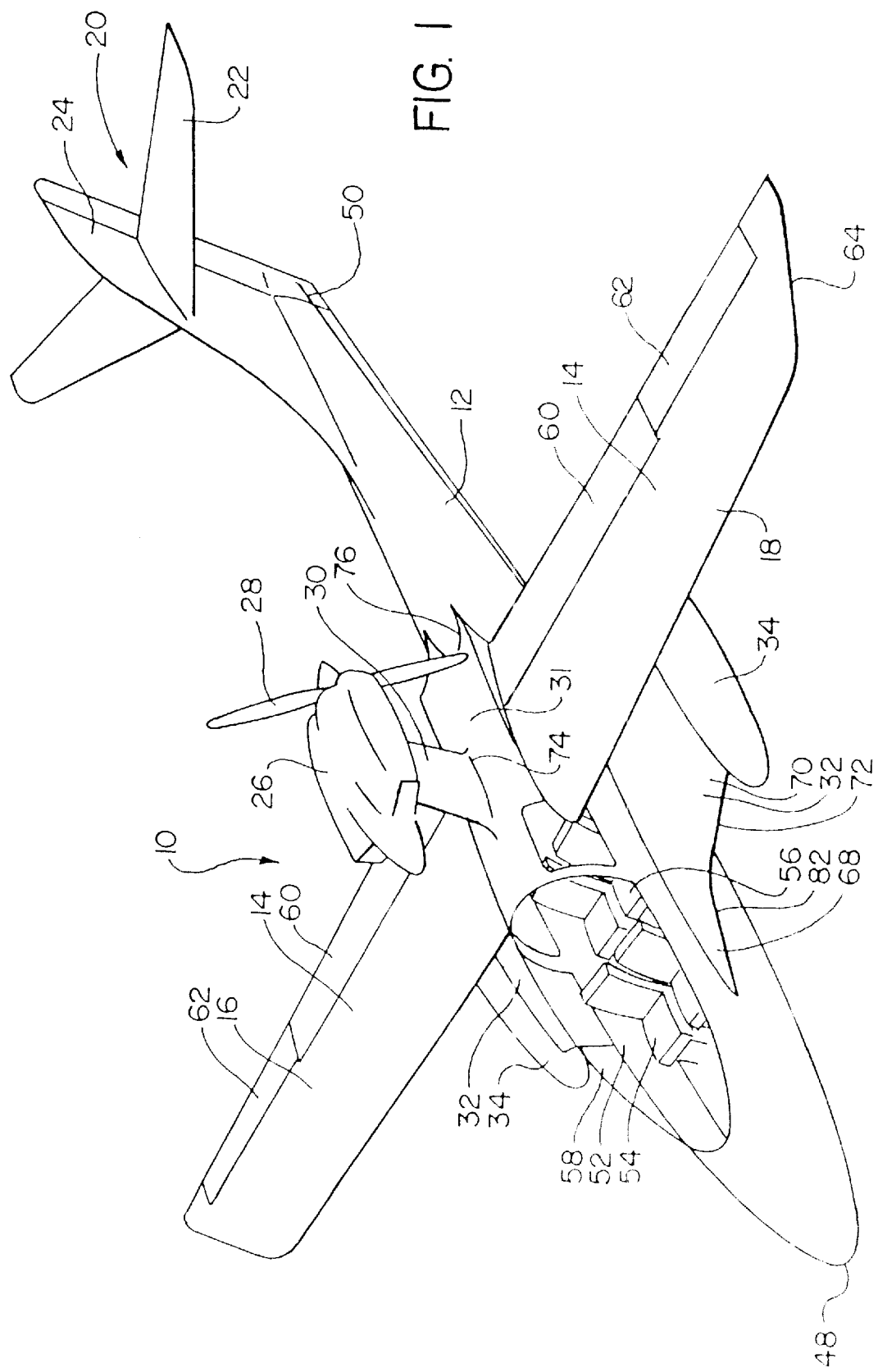
FIG. 1 is an isometric view looking downwardly on the airplane of the present invention.

With reference to FIG. 1, the airplane 10 of a first embodiment of the present invention comprises:

i. a fuselage 12;

ii. a wing 14 comprising right and left wing sections 16 and 18;

iii. a tail section 20 comprising a horizontal fin or tail 22, and a vertical fin 24;

iv. an engine assembly 25 comprising an engine 26 having a propeller 28 and mounted by a pylon 30 to an upper part of the fuselage 12;

v. an upper aerodynamic lift surface 31 which is configured in a manner to create additional lift (augmented lift) and positioned at the top part of the fuselage at the location of the engine assembly 25;

vi. right and left platforms 32, connected to the fuselage 12, with each having a sponson float (pontoon) 34 at the outer end thereof.

Figure 3:
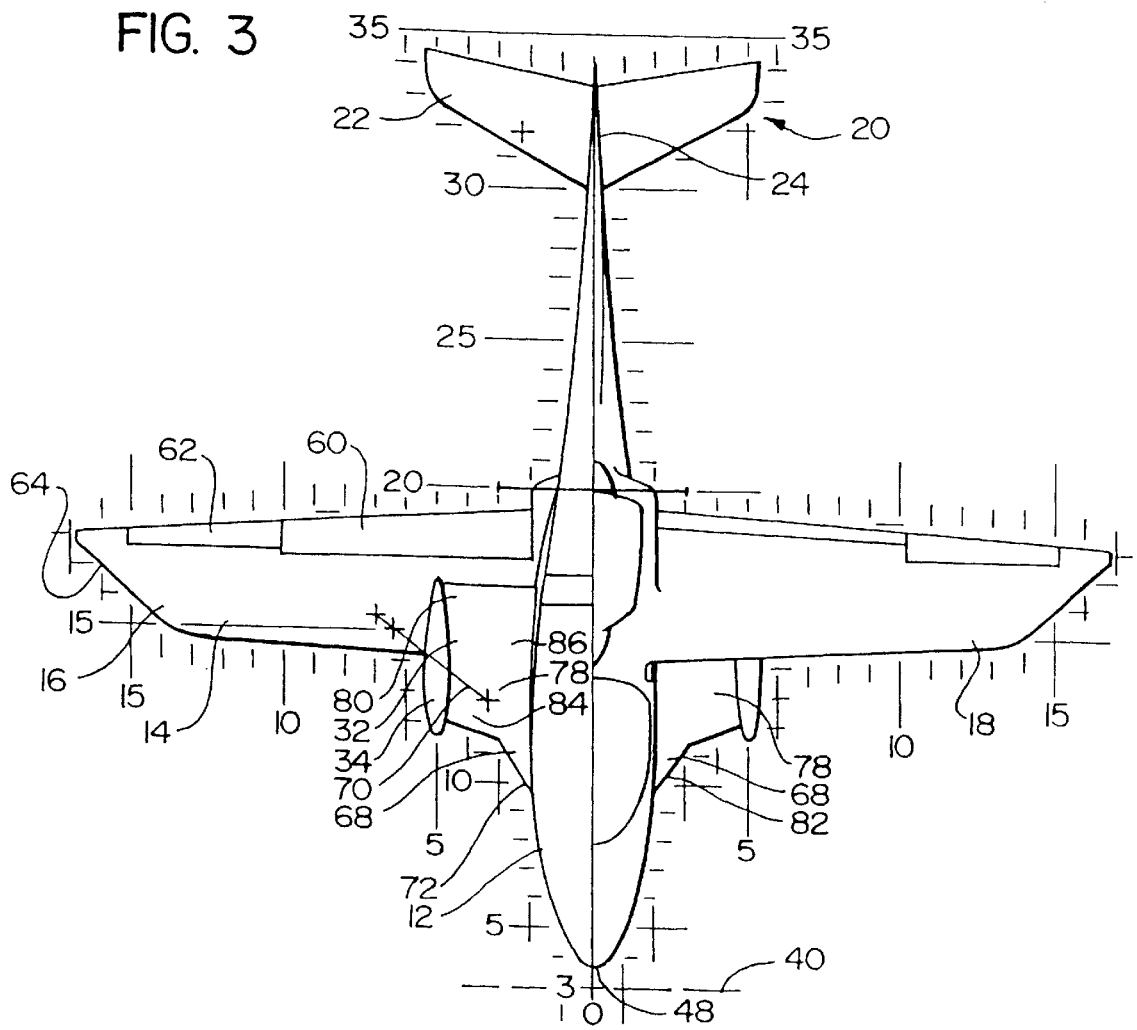
FIG. 3 is a top plan view thereof.
Figure 4:
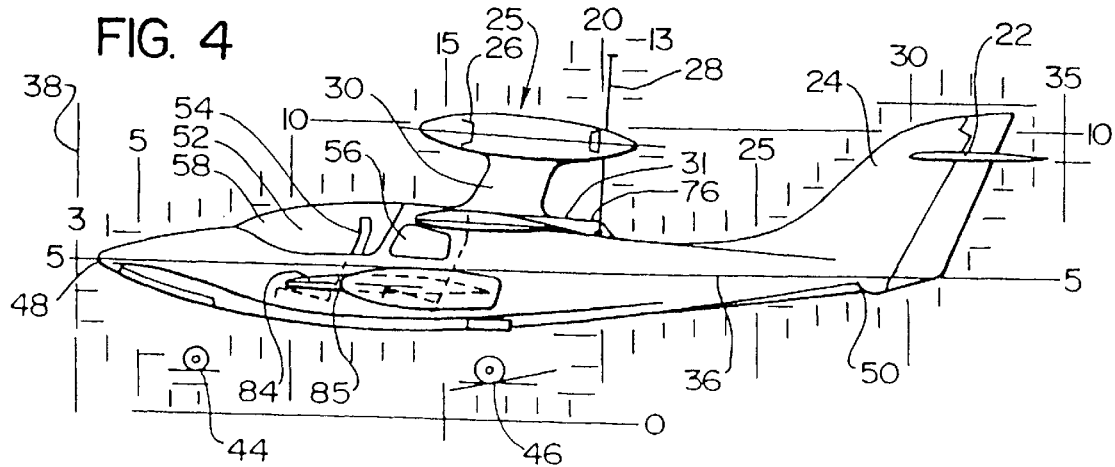
FIG. 4 is a side elevational view thereof.

For purposes of description, the airplane 10 is considered as having a longitudinal center axis 36 extending in a lengthwise direction through the fuselage 12, a vertical axis 38 (See FIG. 4) extending approximately through a center portion of the fuselage, and a lateral axis 40 extending through the intersection of the axes 36 and 38, and perpendicular to the axes 36 and 38 (see FIGS. 3 and 4). FIGS. 3 and 4 are drawn to scale, so the dimensions and configuration of components are intended to be interpreted as representing a presently preferred embodiment.

B. Overall Configuration and Operation of the Present Invention

In this first embodiment, the airplane 10 is an amphibious airplane. Thus, the lower surface portion 42 of the fuselage 12 is contoured to optimize performance for the plane 10 to take-off from, and to land on, water. In addition, there are three retractable ground engaging wheels, namely a forward wheel 44 and two laterally spaced side wheels 46. The forward wheel 44 is retractable in a forward direction into the lower front portion of the fuselage, and the side wheels 46 retract forwardly into the sponsons floats 32 (pontoons).

The fuselage 12 has a forward end 48, and a rear end 50. There is a passenger section 52 in the fuselage 12, and in this preferred configuration, there are two front seats 54 and two rear seats 56. The passenger section 54 is enclosed by a canopy 58 which can be mounted in a number of ways, in accordance with various options of the prior art. For example, the canopy could be formed in a "gull wing" design where there are right and left canopy sections hinge mounted along a longitudinally aligned center mounting means, so that the two canopy sections look like a gull wing when they are open.

Another possibility is a hinge latch design where there are hinges and latches on each side of the canopy so that a person who is approaching the airplane from one side or the other would be able to lift the canopy at a location adjacent to the person. The canopy 58 is transparent, and thus functions as a windshield.

Figure 5:
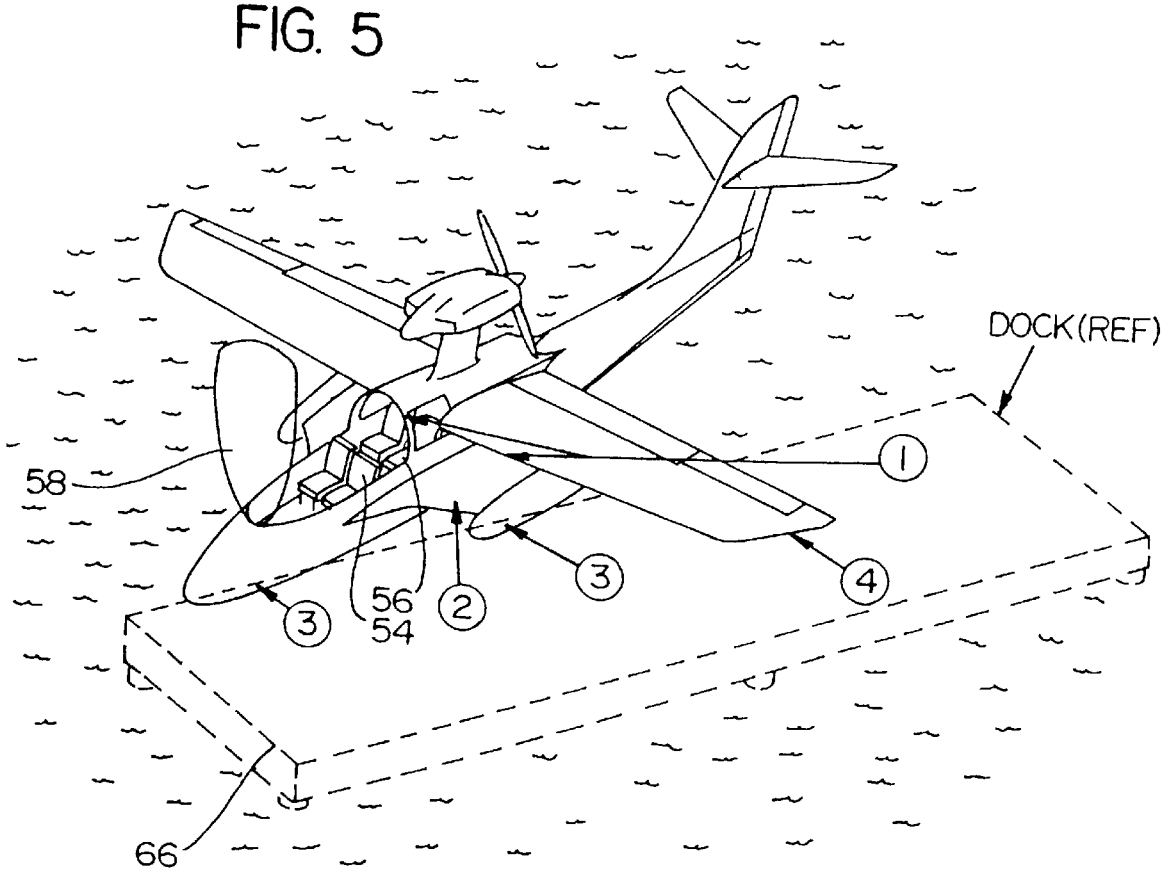
FIG. 5 shows the airplane on water, and being landed at a dock.

The wing 14 can be a conventional airfoil, such as a GAW2 airfoil. The precise configuration of the wing 14 is not critical, but it is important that the characteristics of the wing 14 be compatible with other related components of the airplane 10. As can be seen in FIG. 3, the leading edge of the wing has very little sweep, and there are trailing edge flaps 60 at inboard locations, and flaperons 62 at outboard locations. It will be noted that the outer edges 64 of the wing section 16 and 18 are slanted in an inward and forward direction. The slant is designed to provide dock clearance. Thus, when the plane is positioned or moored adjacent to a dock 66, the edge 64 of the wing section 16 or 18 does not have a projecting front outboard corner (see FIG. 5).

Each platform 32, as its name suggests, serves the function of a "porch" or platform in that it is positioned adjacent to the passenger section 52 so that the pilot or the passenger is able to step onto the platform 32 and then into the passenger section 52. Also, as will be explained more fully hereinafter, each of the two platforms 32 is positioned so that these will provide convenient access to the engine 26 for maintenance, etc.

In addition to the platform 32 providing its support function, it also has other functions rather unrelated to its support function. One of these is that the platform 32 provides the means for mounting the floats 34 at locations spaced outwardly from the fuselage 12. The pontoons 34 are, with the airplane stationary, floating in the water thus giving the airplane 10 greater lateral stability when it is in the water.

Also, the platform 32 is aerodynamically contoured in such a way as to enhance certain operating features of the present invention and also function cooperatively with the other components so that there is a proper blend of the functional characteristics of the interrelated operating components. Each platform 34 has a forward strake 68 which extends alongside the passenger section 52 and its front end is a short distance rearwardly of the fuselage nose 48. The platform 32 has a main section 70, located rearwardly of the strake 68, having a moderately rearwardly swept leading edge 72. The strake 68 in addition to having an aerodynamic effect, functions in the matter of a chine in that water which would tend to spray upwardly around the fuselage during the water traveling mode of the airplane 10 is deflected by the strake 68, so that it does not travel around and over the airplane. The aerodynamic and other functional features of the two platforms 32 will be discussed later in this text.

The engine 16 is a push engine with the propeller 28 located rearwardly of the engine 26. The pylon 30 is vertically aligned and is connected by its upper end to the approximate center of the engine 26, and by its lower end is connected to the to middle portion 74 of the fuselage 12 at about the mid length of the aforementioned lift augmenting surface 31. The propeller 28 is located at the rear portion 76 of the lift surface 31, and this rear portion 76 has in transverse cross section a concavely curved configuration to closely match the circular path of the outer end of the propeller 28. This rear surface portion 76 is spaced a very short distance radially outwardly from the outer edge of the propeller 28. As the propeller 28 rotates to create thrust, the velocity of the air stream flowing toward and through the area of the propeller is greater than the velocity of the surrounding air stream and thus enhances the lift created by the surface 31.

The horizontal fin 22 is positioned at an upper location in the tail section 20, so as to be in the middle of the path of the air stream flowing from the propeller 28. Thus, the increased velocity of the air stream traveling from the area of the propeller 28 enhances the ability of the horizontal fin 22 to create its vertical force component.

These features will be discussed later in this text.

C. Aerodynamic and Flying Characteristics of the Present Invention

Figure 6:
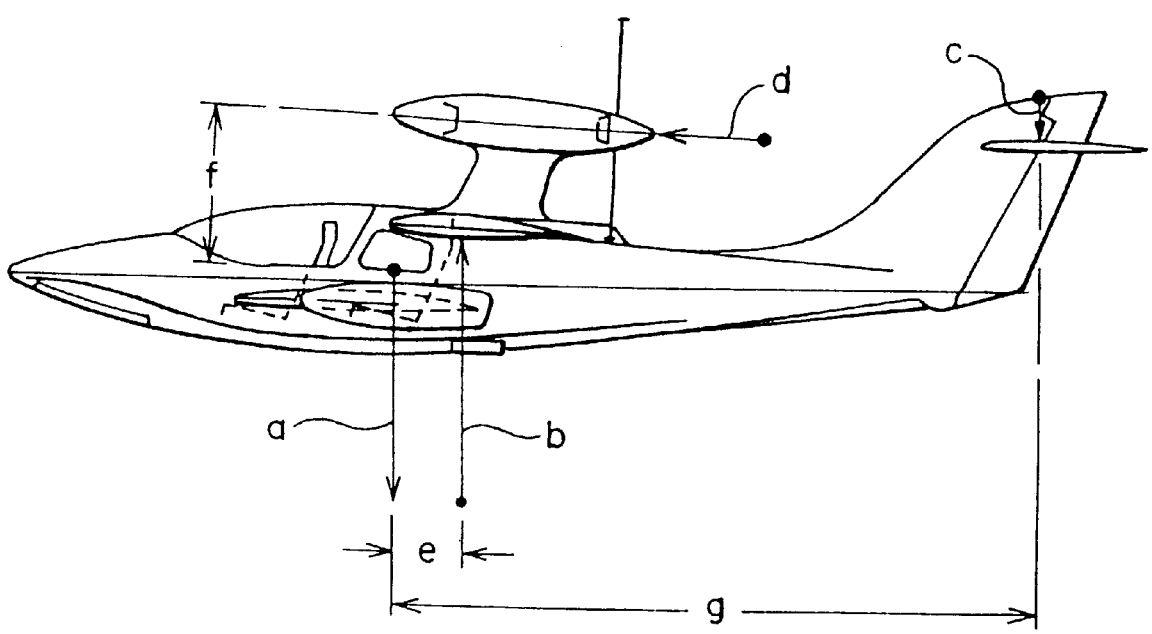
FIG. 6 is a side elevational view of the airplane, showing various force components related to tee stability and performance of the present invention.
Figure 8:
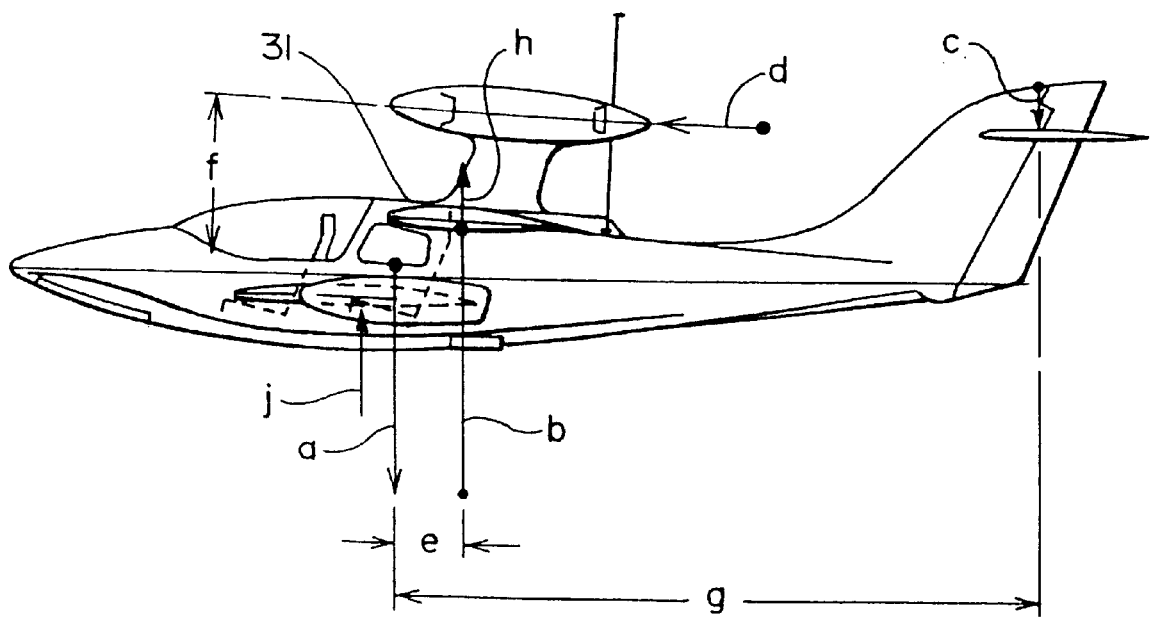
FIG. 8 is a side elevational view similar to FIG. 6, but showing additional force component relative to the operation of the airplane.

Reference is made first to FIGS. 6 and 8, which illustrates the airplane 10 positioned to operate in its cruise mode. For purposes of explanation, in FIG. 6 there is shown only four of the main force components which act on the airplane. These are as follows:

i. the weight of the airplane which acts at the center of gravity (c.g.) of the airplane, designated "a";

ii. the lift contributed by the wing 14, this force being illustrated at "b";

iii. the vertically downward force component "c" contributed by the horizontal tail fin 24;

iv. the forward propulsive force generated by the propeller 28, indicated at "d".

It is evident this is a somewhat simplified diagram, since it does not take into consideration the aerodynamic forces generated by the lift surface 31 and the two platforms 32. Nor does it consider other aerodynamic forces, such as the drag forces that are distributed over the airplane, etc. Since the vertical forces must balance (assuming that the plane it is not accelerating either upwardly or downwardly) the force "a" (the weight of the plane) plus the downward force "c" exerted by the horizontal tail 24 equal the lift force "b" exerted by the wing 14.

Also, assuming that the plane 10 is maintaining the same orientation, the moments about the center of gravity (c.g.) must balance. It will be noted that the center of lift for the wing 14 is a moderate distance behind the vertical force component "a" exerted by the weight of the airplane at the center of gravity. Thus, if only the force components "by" and "a" were acting, there would be a counterclockwise moment exerted by the lift force "b" about the moment arm "e" (the distance between the two force components "a" and "b") to rotate the nose of the airplane downwardly. However, the downward force component exerted at "c" by the horizontal fin 24, acting about the moment arm "g" (the perpendicular has a distance between the force components "a" and "c"), has a moment exerted in a clockwise direction about the center of gravity to have a counterbalancing effect on the moment resulting from the lift force "b".

Then there is a third moment created by the propulsion force "d" about the moment arm "f", which is the perpendicular distance between the center of gravity (cg) and a line perpendicular to the force component "d", this moment being in a counter-clockwise direction.

In order to "aerodynamically balance" the airplane, the tail fin "22" is set to exert the proper downward vertical force "c" to create the balancing moment.

Figure 7:
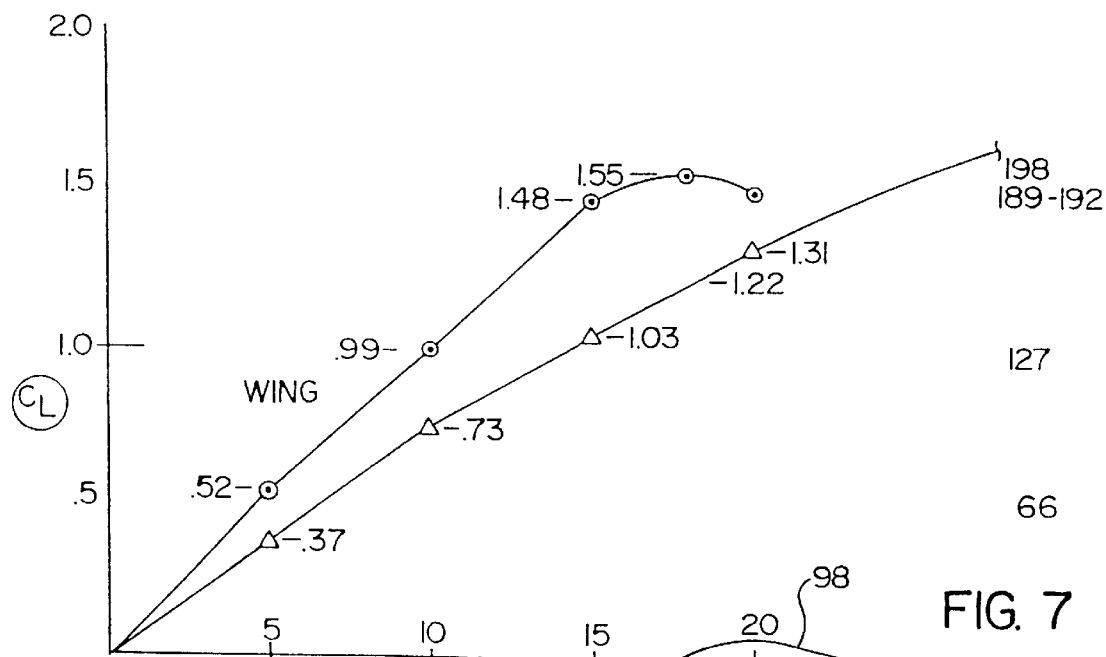
FIG. 7 is a graph plotting the lift coefficient against the angle of attack.

Reference is now made to FIG. 7 which is a graph plotting lift coefficient ($C_L$) over angle of attack (da). As the angle of attack increases, the lift force of the wing increases, thus increasing the moment exerted about the center of gravity by the lift force "b" (see FIG. 6). Also, as the lift increases (e.g. when the airplane is climbing), it can be expected that the thrust force "d" of the propeller will increase, thus increasing the moment of this force "d" about the moment arm "f", this also being a counter-clockwise moment. Both of these forces must be counteracted at least in large part, by the moment created by the downward aerodynamic force "c" exerted by the tail 24.

In this regard, it will be noted (as indicated previously) that the position of the horizontal tail 22 is in the middle of the air stream flowing rearwardly by the propeller. The thrust exerted by the propeller is proportional to the square of the change in velocity of the air stream from the propeller. In the climb mode where a greater lift force (b) is exerted by the wing, the horizontal fin is able to generate a proportionately higher downward aerodynamic force, because of the higher velocity of the air stream from propeller. Since the moment arm "g", about which the force "c" of the horizontal tail 22 acts, is several times longer than the moment arm "e", the downward force "c" of the horizontal tail is proportionately smaller.

It is apparent from the above discussion that the vertical location of the propeller 28 (which in this preferred embodiment is the same as the vertical location of the engine 26) is a significant factor in obtaining a proper balance between these various forces. There are advantages to placing the engine nacelle in its present position where it is spaced above and rearwardly of the canopy 58. The noise generated by the engine and propeller is behind the passenger section 52. The vision of the pilot (and passengers) is substantially unobstructed by the engine 26. Also, with the engine 26 at this height and spaced upwardly and rearwardly from the platforms 32, there is much less likelihood of water spray impinging on the engine 26 and being ingested into the air inlet openings of the engine 26. Finally, it is unlikely that the propeller could strike a person boarding the aircraft.

On the other hand, if the engine 26 and the propeller 28 are moved further upwardly, it becomes necessary not only to move the horizontal tail 24 upwardly so as to be in the air stream generated by the propeller 28, but the horizontal fin would need to be made larger to generate a greater downward aerodynamic force because of the greater moment arm of the propeller thrust. This would compel design modifications which would add weight and present other complications. Thus, there is a balance between design trade-offs, and present analysis indicates that the overall configuration shown in FIG. 4 represents these locations where they would provide a reasonable balance. However, it should be recognized that there are yet other design components which affect this, and these all must be integrated properly to obtain the best overall balance.

Now reference is made to FIG. 8, which shows the same information as present in claim 6, but has two further aerodynamic forces added. First, there is the lift force "h" which is exerted by the lift surface 31 that extends over the top of the fuselage 12. Second there are the two lift forces "j" exerted by the two platforms 32.

The center of lift of the surface 31 will depend upon other design features, such as the location of the passenger section 52, the positioning and configuration of the canopy 58, and also the positioning of the engine 26 and the propeller 28. Present calculations indicate that the lift force "h" of the surface 31 could contribute an improvement in the overall optimum lift to drag ratio (L/D) of the airplane between two percent and four percent at cruise speed. Thus, while this provides significant benefit, the overall magnitude of the force "h" would be relatively small in comparison with the lift "b" exerted by the wing 14. Nevertheless, this lift force "h" of this surface 31 is another factor which must be considered in the overall "balancing act". Present analysis indicates that if the lift force "h" is behind the center of gravity of the aircraft and close to the center of lift for the wing, the moment created by the lift is proportionately countered by the horizontal tail.

The aerodynamic design of the two platforms 32 presents both challenges and opportunities. The two platforms 32 are added to the airplane essentially for reasons other than aerodynamic. More specifically, the platforms 32 (as the name implies) provides a stepping place by which people can step into the passenger section 52, or depart from the airplane by stepping down to one of the platforms 32, and thence onto the dock or other landing location. In addition, the two platforms 32 enable the pontoons 34 to be placed at laterally placed locations for better stability for water travel. Also, the pontoons 34 provide a convenient storage space for the retracted side wheels 46.

However, in order to employ the platforms 32 to serve in these functions, the overall design requires that the platform 32 be placed forward of the wing 14. In the presently preferred design, the rear portion of each platform 32 is beneath the wing 14, while the forward portion extends forwardly of the wing 14. The challenge in the design and placement of these platforms 32 is how to aerodynamically configure the platforms 32 so that any negative impact on performance is minimized, and also to optimize any possible aerodynamic benefits.

For purposes of analysis of the aerodynamic performance, each platform 32 can be considered as comprising three sections, namely:

i. the strake 68, ii. the front portion 78 of the main platform section 70, which begins at a longitudinal location at about the leading edge of the wing 14 and extends forwardly therefrom; and iii. an aft section 80 of the main platform section 70.

In a later section of this text, the configuring of the platforms 32 will be discussed in more detail. In this section, the design of the platforms 32 will be discussed to an extent sufficient to explain how the platforms 32 are arranged to be properly integrated into the overall airplane.

With regard to the two strakes 68, the leading edge 82 of each strake is highly swept (at an angle of between about 10° to 30° (and more desirably between about 10° and 20° from the longitudinal axis 36), so that each strake generates a strong vortex that travels upwardly around the strake leading edge 82 and over the main platform section 70. The strake is configured and has sufficient length and width dimensions, so that the strong vortex continues to be generated even during very high angles of attack. The vortex gets larger as it moves down the strake and sweeps over a major portion of the main platform section 70 to maintain attached flow over the platform sections 32.

The upper and lower surfaces 84 and 85 of the forward portion 78 of the main platform section 70 are aerodynamically contoured to create an upward vertical aerodynamic force. In the present preferred design, the vertical force exerted by the forward platform portion 78 is a lifting force to increase L over D. However, within the broader scope of the present invention, this vertical force may be neutral, or even a downward force if it would contribute to a desirable balance in the integrated design of the airplane.

With regard to the rear platform section 80, as indicated above, this is positioned below the wing 14. In the present preferred design, the upper surface 86 of the rear platform portion 78 is contoured to follow the streamlines resulting from the airflow of the upper wing 14. It is presently contemplated that this upper surface contour 86 would be such so that it would be aligned with the streamline of the flow around the wing 14 so as to be "invisible".

However, further wind tunnel testing may indicate that this upper surface 86 could be contoured to produce certain aerodynamic benefits, or at least to minimize any undesirable effects resulting form the platforms 32.

Figure 9:
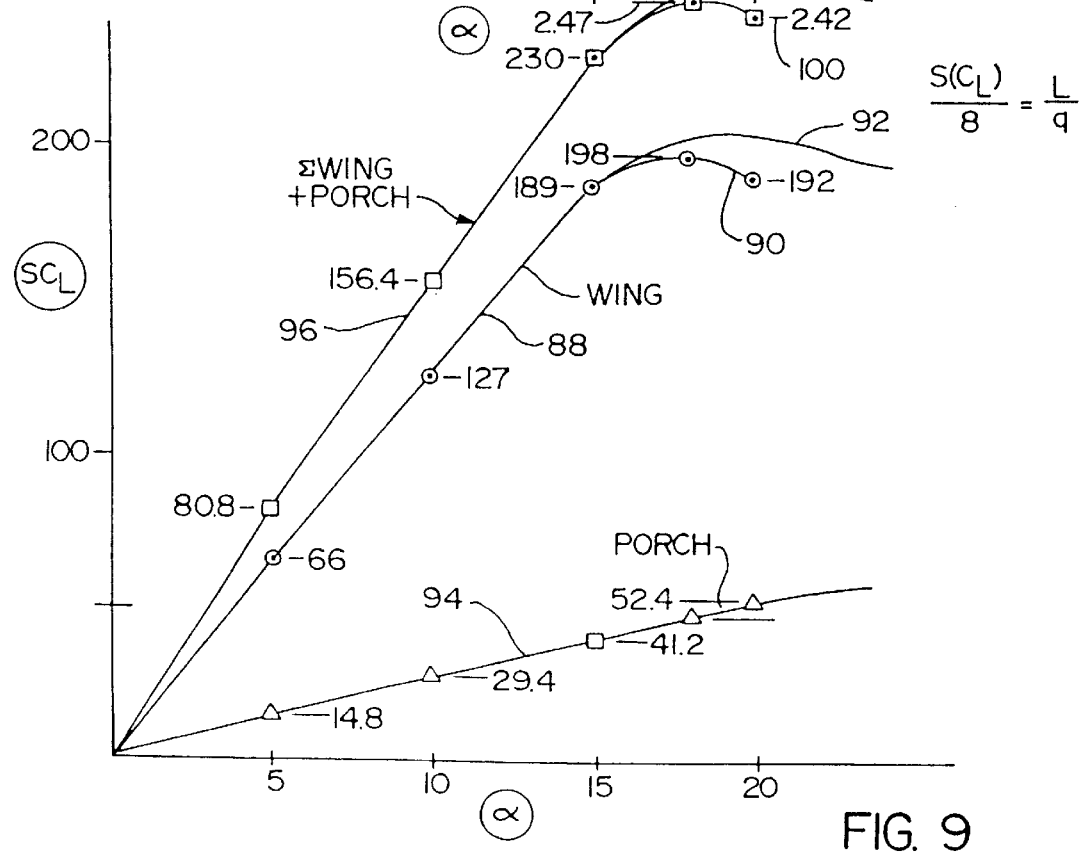
FIG. 9 is a graph showing actual lift of the airplane relative to angle of attack, and showing individual curves illustrating the effect of individual components.

To discuss the overall aerodynamic effect, reference is now made to FIG. 9, which plots the actual lift generated versus angle of attack. In FIG. 9, the lift provided the wing only is represented by the curve 88, and it can be seen that this increases with angle of attack until the wings begins to stall so that the lift decreases in an irregular fashion as indicated by the curved portion 90. However, as the angle attack increases, it is expected that the lift generated by the propeller directing its thrust with a greater vertical force component would provide a certain amount of lift, and this is indicated at 92. There is also continued lift created by the augmentation channel.

The lift provided by the strake alone is indicated at 94, and it can be seen that as the angle of attack increases, the vortex becomes stronger and continues to generate lift at rather high angles of attack, much greater than the point at which the wing 14 would stall.

The curve at 96 illustrates the summation of these various lift forces, with the curve portion 98 combining all of the forces.

As indicated previously, the entire design of the airplane 10 is highly integrated, in that the changes in one component of the airplane would require corresponding modifications in the others. Obviously, a highly critical consideration in airplane design is the stability of the airplane. Let us now review how the various aerodynamic forces, weight of the airplane, and propulsive forces interact with one another during different modes of operation.

We begin by examining FIG. 8 which represents the various forces with the airplane in cruise mode. Let's first examine the situation where the airplane loses power so that the propeller 28 generates no thrust. Thus, the counterclockwise moment generated by the thrust of the propeller is lost. On the other hand, the clockwise moment of the horizontal tail 24 is diminished since the air velocity passing over the horizontal tail 24 is simply the velocity of the free stream air. On the other hand, as indicated previously, when the thrust of the engine assembly 25 is increased, thus increasing the counterclockwise moment as seen in FIG. 7, the air stream velocity immediately in the path of the propeller increases, thus increasing the downward aerodynamic force "c" generated by the tail so that these moments tend to cancel each other out.

As the angle of attack increases, the vortex generated by each strake 68 becomes stronger and larger, with higher velocity, and with the vortex sweeping over the major portion of the main platform portion 70. Since the forward part 78 of the platform is contoured for aerodynamic lift, and the aft part of the platform might be aerodynamically neutral with regard to lift, the rather strong vortex sweeping over the entire upper surface of the platform portion 70, causes the center of lift for the entire platform to move further rearwardly. Depending on the specifies of the design, the center of lift could move all the way back to (or close to) the location of the center of gravity so that the two platforms would improve the stability of airplane 10.

Further, at any angle of attack great enough so that the wing starts going into stall, so that the lift generated by the wing 14 diminishes, the plane would have a tendency to go nose down. Further, at such high angles of attack, the vertical force generated by the horizontal tail could actually become a lifting force tending to move the nose down. Then as the plane would go more nose down so that the angle of attack is much lower, then the horizontal tail 22 could go back into its mode of generating a downward force component to impart a clockwise moment to prevent the plane from going too far nose down. Present analysis indicates that in this situation the strake 68 and the main platform would create a lifting force with the center of lift being located so that this would tend to alleviate the effect of the stall and contribute to the stability of the aircraft.

D. Structure and Construction of the Present Invention

Reference is now made to FIG. 10, which shows the various components of the present invention in exploded view, with these components being combined into functional groups. There are five groups, namely:

a propulsion group 110;

a wing group 112;

an upper fuselage group 114;

a lower fuselage group 116;

an interior group 118.

The propulsion group 110 comprises the aforementioned engine assembly 25 made up of the engine 26, the propeller 28 and the strut 30. The nacelle is made of four nacelle components 120, and there is an auxiliary fuel tank 122 mounted in the nose of the nacelle. The strut 30 has forward and rear fairings 124 and 126, and the forward lower end of the strut 30 is connected to a horizontal structural member 128 (as will be described below) is mounted to the main spar of the wing.

The wing group 112a comprises a main spar 130 which extends through substantially the entire length of the wing 12, and is the main structural member of the wing. Two auxiliary spars 132 are positioned rearwardly of the main spar 130, and forward spars can be provided, as at 134. The wing 14 comprises a plurality of ribs 136, and there are upper and lower wing skins 138.

The upper fuselage group 114 comprises right and left upper fuselage sections 140 (specifically provided as "monocoques"). These monocoques 140 are made as structural members, desirably honeycomb structure, and these cooperate with the main structural components to carry the loads fore and aft.

A main structural box 142 is provided, and comprises a forward U shaped main structural member 144 and a rear rectangular shaped structural member 146 structurally interconnected with one another and the monocoques 140 to form a rigid structural box. The upper ends 148 of the U shaped structural member 144 are fixedly connected to the main spar at 150 (see the structural group 12 in FIG. 10). Other U shaped structural members are shown within the upper fuselage group 114, and these will not be described individually.

The upper fuselage group 114 also comprises the aforementioned canopy 58. The aforementioned lift augmenting surface 31 is provided as a forward fairing 150, and a rear aerodynamically contoured member 152 which transitions into a configuration to provide a moderately concave circular surface in cross section at the location of the propeller 28.

The lower fuselage group 116 comprises the lower fuselage section 154 (lower monocoque) which is also provided as a structural component, desirably made as honeycomb structure.

There is a structural frame 156 which extends across and outwardly on opposite sides of the lower fuselage section 156 to support the aforementioned platforms 32. The avionics equipment is shown at 158, and flight control components are shown at 160. The skin portions of the platforms 32 are shown at 162.

The interior group 118 comprises the passenger section 52 made up of the front seats 54 and the rear seats 56. Behind the rear seats 56 there is provided a cargo compartment 164. Also, suitable support structure 166 is provided for the cargo compartment 164 and the seats 54 and 56.

Reference is now made to FIG. 11 which is a side elevational view of the aircraft 10, with the forward near side of the fuselage stripped away for purposes of illustration, and also with the engine assembly having the outer cover portions removed therefrom.

It can be seen that the main structural box 142 (made up of the forward U shaped frame 144 and the rear rectangular frame 146) is positioned to be above the rear wheels 46 and also aligned with the strut box 123. The back portion of the rear seat 56 is just forward of the main structural member 144, and thus just forward of the main spar 130.

To point out other components shown in FIG. 11, there is a frangible forward nose section 166, flight instruments 168, a storage pocket 170, and pitch/roll sticks 172. The forward portion of the platform support structure is shown at 174, and the rear beam of the platform support structure is at 176. A retractable step actuating mechanism is shown at 178.

Also, it will be noted that the fuselage has been shown in cross section and as can be seen (as indicated by 180) the fuselage 12 in large part is made as honeycomb structure. There is a rudder 182, and it can also be seen a control mechanism 184 positioned within the vertical tail fin 24.

To review briefly, the manner in which the loads are reacted throughout the aircraft, in the flight mode the lifting force exerted on the wing 14 is transmitted in large part through the main spar 130, which is directly attached to the forward main structural member 144 of the main support box structure 142. Also, the weight of the engine assembly 25 is transmitted into this box structure 142, and the thrust force of the engine assembly 25 is also transmitted into the box structure 142. It can be seen that the rear cross member 176 of the platform support structure is connected to the forward U shaped structural member 144.

The forward seats 54 are forward of the center of gravity (C.G.), and in balancing the various design features of the present invention, this is taken into account in providing for the stability of the airplane. The rear seats 52 are located at approximately the center of gravity, so that whether there are passengers in the rear seats 56 or not, this would not have any significant effect on the stability of the airplane. That portion of the fuselage which is rearwardly of the passenger section 52 would be empty space, and this could be conveniently utilized for storage. Also, the seats 54 and/or 56 could be made movable so that these could be moved further rearwardly within the fuselage so that the people in he airplane would have an open area within which to rest or sleep.

The front edge of the nacelle has a bullet shaped fairing. This permits the auxiliary gas tank 122 to be positioned in the nacelle. The main gas tank is positioned in the wing. The gas would be pumped up to the main tank in the forward part 102 of the engine nacelle 104. In case there is a failure in the pumping mechanism, there would be a supply of gas (possibly a fifteen minute to half an hour supply) to keep the engine 26 powered for at least a short period of time.

Figure 2:
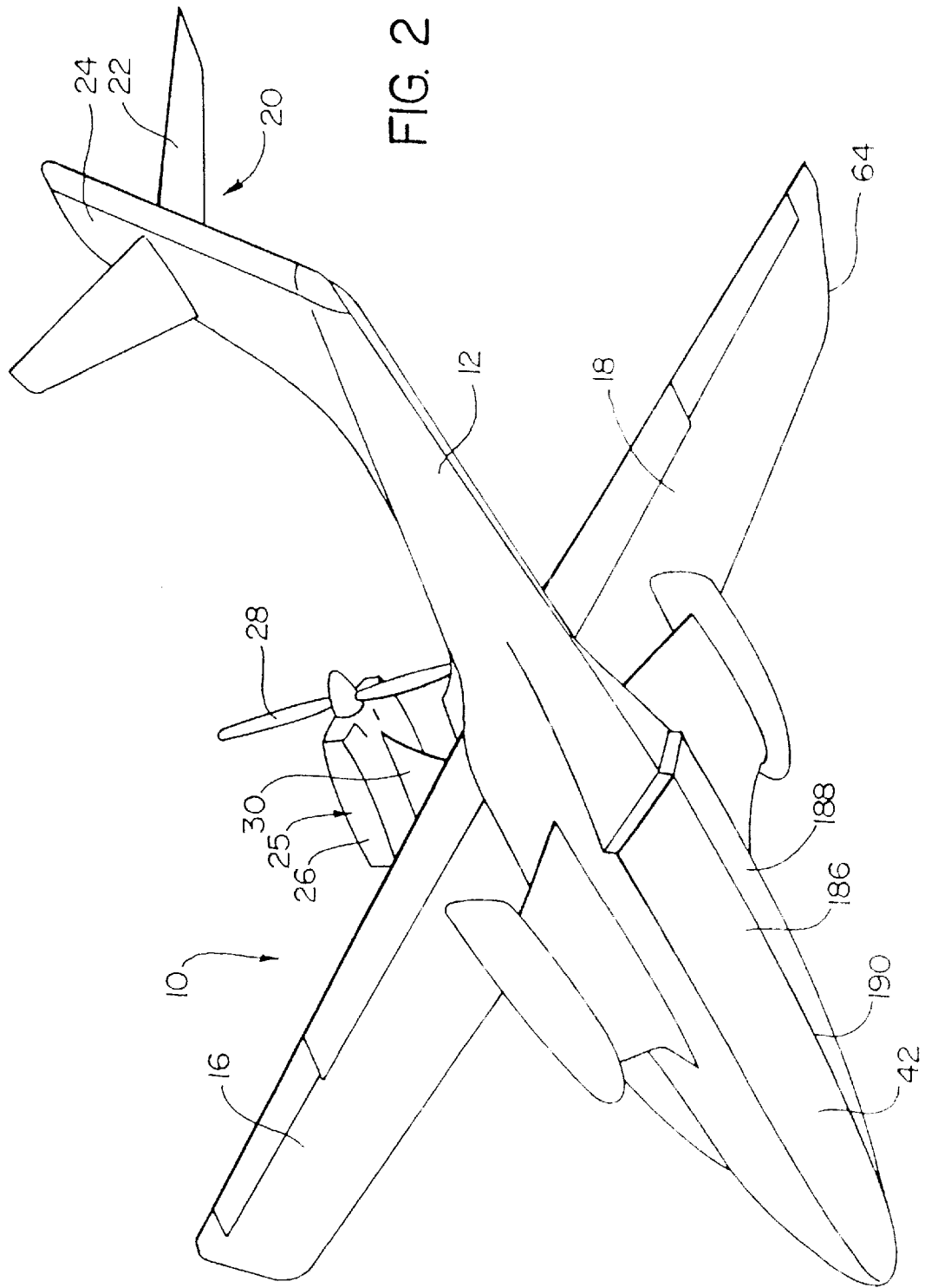
FIG. 2 is an isometric view looking upwardly toward the airplane of the present invention.

With regard to the lower surface 42 (FIG. 2) of the fuselage, it will be noted that there are right and left surface sections 186 and 188, which meet at a center line 189. These two surface sections 186 and 188 slope downwardly and inwardly toward the center line 189. (See FIG. 2).

Figure 12:
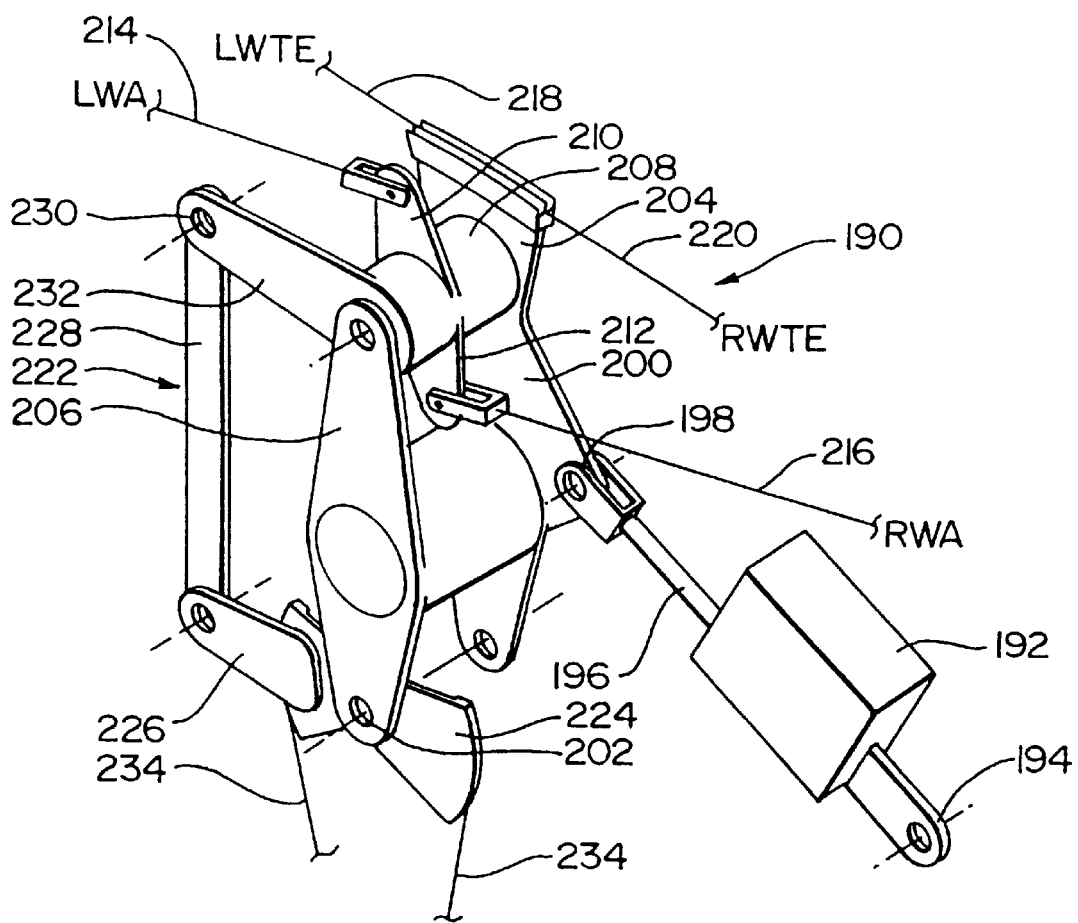
FIG. 12 is an isometric view of an actuating mechanism for the flaps and flaperons.

Another feature of the present invention will now be described with reference to FIG. 12, which shows a control mechanism for the flaps 60 and the ailerons 62 which function as flaperons. This mechanism is generally designated 190, and it has the capability of moving the flaps 60 and the flaperons 62 together to various angles of deflection, and superimposed upon this overall motion of the flaps 60 and flaperons 62 together, the flaperons 62 can be moved in opposite directions upwardly and downwardly relative to the flap 60. This mechanism 190 comprises a main flap only actuator 192 which is connected at 194 to fixed structure and has an extendable and retractable actuating rod 196 pivotally connected at 198 to a main arm member 200 which is in turn hinge mounted to stationary structure at 202. The arm 200 comprises laterally spaced plate members 204 and 206, and there is a cylindrical connecting member 208 positioned between the outer ends of the two plate members 204 and 206 so as to be rotatable about the center axis of the member 208. The member 208 has fixedly connected thereto outwardly extending arms 210 and 212, each of which has a connection at 214 and 216 to a related flaperon.

It is apparent that when the actuator 192 extends or retracts the rod 196, and with the arms 210 and 212 maintaining the same angular orientation relative to fixed structure, the flap connections 218 and 220 and the aileron 214 and 216 will all move together. Thus, the flaps 60 and the flaperons 62 all move in unison to the same angular position.

To superimpose the aileron motion to the flaperon 62, there is additionally provided an actuating linkage designated generally 222. This comprises a member 224 rotatably mounted at its center about the aforementioned fixed axis 202. Rigidly connected to this member 224 is an extension 226 that is in turn connected to a vertically oriented member 228 connected at 230 to an arm 232 that in turn is fixedly connected to the aforementioned cylindrical member 208. Thus, it is apparent that the two arms 226 form with the arm 228 and the aforementioned plate 206 the four bar linkage which maintains the same angular orientation of the arms 210 and 212.

The arm 224 has connections at 234 to the aileron control. Thus, when the aileron only control members 234 cause rotation of the arm 224, the aforementioned member 210 that is connected to the aileron control members 214 and 216 will rotate.

To review briefly the operation of this mechanism 190, if there is no separate input to the flaperons 62 through the connections 234, then the actuator 192 will extend or retract the rod 196 to cause the flap output connections 218 and 220 and the flaperon output connections 214 and 216 to move together. Let us assume for the moment that the flaps 60 and flaperons 62 are rotated downwardly to a high lift position. To superimpose the flaperon motion onto the flaperon 62, while the actuator 192 remains stationary, the flaperon inputs 234 act through the linkage 228 to move the aileron control connections 214.and 216 independently of the flap output connections 218 and 220.

E. Aerodynamical Related Design Features of the Present Invention

As indicated previously in this text, the overall design of the present invention is highly integrated, and the components are interrelated so that repositioning of certain components, or modifications of the aerodynamic design have an effect on other components. Analysis has provided sufficient data to arrive at what is presently believed to be an optimized or near optimized design. However, it is to be understood that actual wind tunnel testing, and also possible further design analysis, would quite possibly lead to minor departures from the presently believed optimized design parameters.

Figure 13:
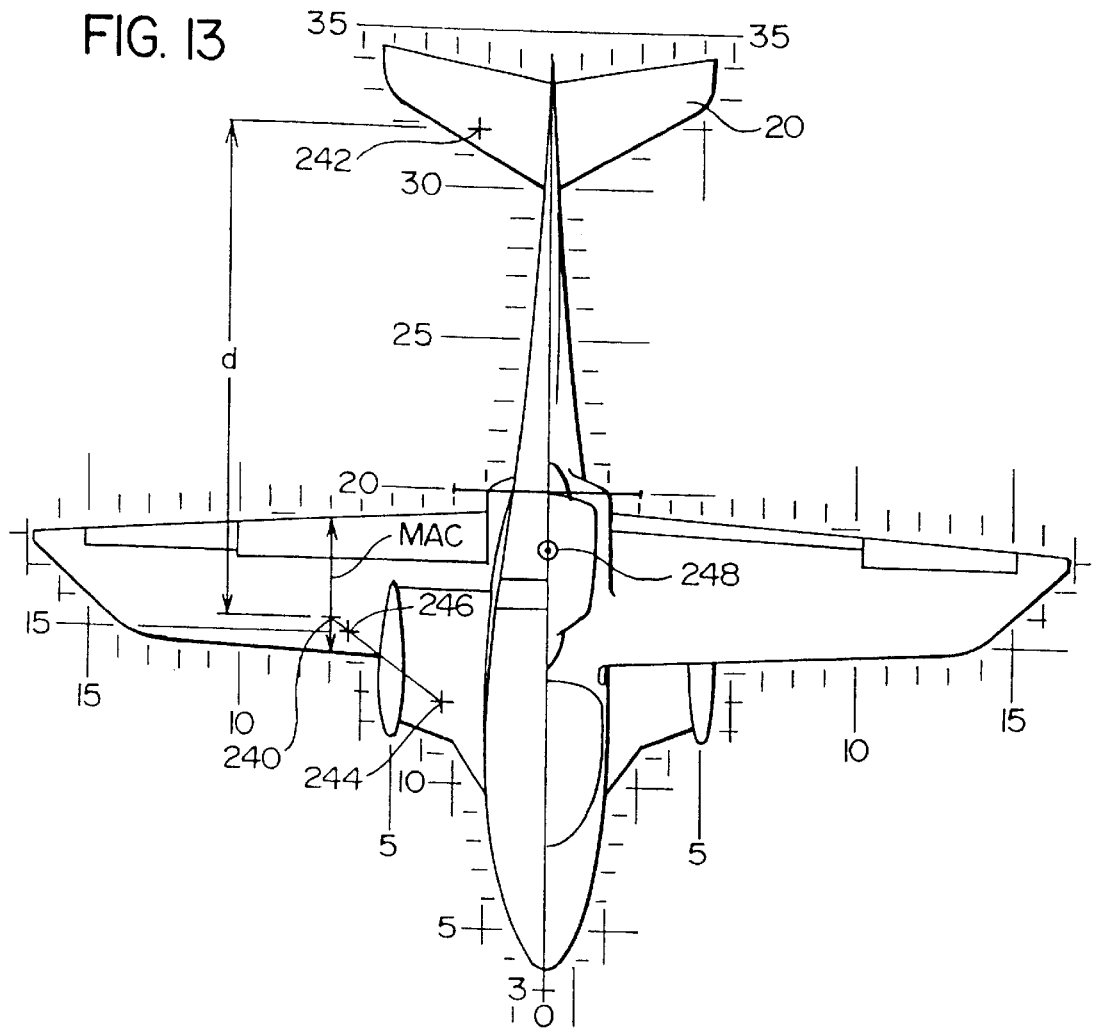
FIGS. 13 and 14 are views similar to FIGS. 3 and 4, showing aerodynamic relationships of the present invention.
Figure 14:
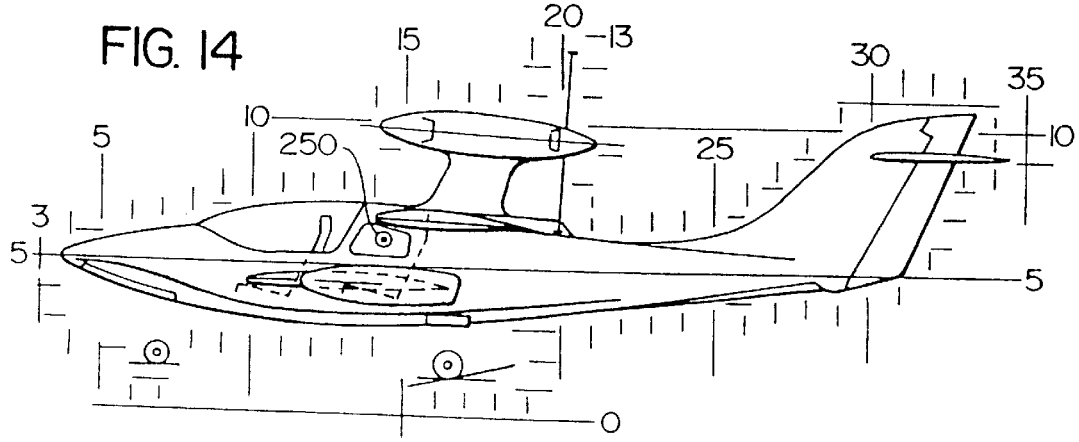

To discuss these aerodynamic features and other features further, reference is made to FIGS. 13 and 14. It will readily be recognized that FIGS. 13 and 14 are the same as FIGS. 3 and 4, but for clarity, the numerical designations have not been added to these figures. To provide a basis of reference both as to location and to dimensions, two values have been chosen in this text. First, there is the mean aerodynamic chord (MAC) which is a well known and readily identifiable reference line in aerodynamics. The MAC of the wing 14 is indicated at FIG. 13. A second reference value is the horizontal tail arm (d). This is the distance from the quarter chord (MAC) to the center of lift of the horizontal tail. In FIG. 13, the quarter length (MAC) is indicated at 240, and the center of lift of the horizontal tail 20 is indicated at 242. The distance "d" is indicated on FIG. 13.

The point indicated at 244 in FIG. 13 is the quarter chord (MAC) of the platform 32. The point 246 on FIG. 13 is the quarter cord (MAC) which is the weighted addition of the quarter chord (MAC) points at 240 and 244. Thus, there is an airplane reference MAC which is the weight average summation of the wing only MAC and the exposed platform MAC. The table below documents the geometric values resulting from the geometry of the airplane 10 as shown in FIG. 13.

| Component | MAC (inches)* | Location of ¼* MAC Along Airplane Length (inches) |
| --- | --- | --- |
| Wing 14 only | 43.2 | 186 |
| Platform 32 only | 62.0 | 156 |
| Weight Combination | 45.6 | 180 |

*These could vary following final configuration definition.

In denoting locations and also distances in identifying the relative location of components, the forward and rear location shall be given in terms of distance forwardly or rearwardly from the point 246 which is the airplane reference quarter cord MAC points. Distance will be given in terms of percentage of the length of the airplane reference MAC which is 45.6 inches for this specific airplane, (as shown in FIG. 13), and a plus will indicate distance in a forward direction toward the nose of the airplane and a minus will indicate percentage distance rearwardly from the point 246. Thus, if a location is 96.2 inches forwardly of the point 246, then its distance shall be considered as plus two hundred percent.

In FIG. 13, the center of lift of the aerodynamic surface 31 is indicated at 248. In the present preferred design, this is located at a minus seventy five percent, relative to the point 246. With the size of the airplane as given in FIG. 13, this would be approximately 34 inches rearwardly from the point 246. Within the broader limits of the present invention, it would likely be possible to move this center of lift 248 fifty percent forwardly or rearwardly, but very likely less than one hundred percent in either direction. As indicated previously, since the design of this airplane is highly integrated, such shifting of the center of lift of the lift surface 31 would cause adjustment in the location and possibly the configuration of the other components.

With reference to FIG. 14, the center of gravity of the entire airplane is indicated at 250. Present analysis indicates that the center of gravity could vary in a range between about twenty two percent forward of the point 246 or possibly three percent aft. Within the broader range, present analysis indicates that the airplane center of gravity 250 should very likely be less than (or no greater than) fifty percent forward of point 246 and less than (or no greater than) twenty five percent rearwardly of the point 246. In any event, the center of lift of the airplane would in any case be no closer to the center of gravity than about one third of the airplane reference, quarter cord MAC.

With the airplane engine 26 being between about twenty five percent to thirty percent of the total weight of the airplane, obviously the position of the engine is a critical factor. In the design of the present airplane, the precise placement of the engine is probably the last item which would be determined after the other design features are fairly well set. Then the location of the airplane either further forward or further aft is a final adjustment.

In the present configuration, the distance "d" is approximately 3.6 times as great as the airplane reference MAC. However, within the broader range of the present invention, this ratio of the airplane reference MAC to the distance "d" could vary between three to one to four to one, but no less than (or greater than) two and one half to one, and no greater than five to one.

Figure 15A:
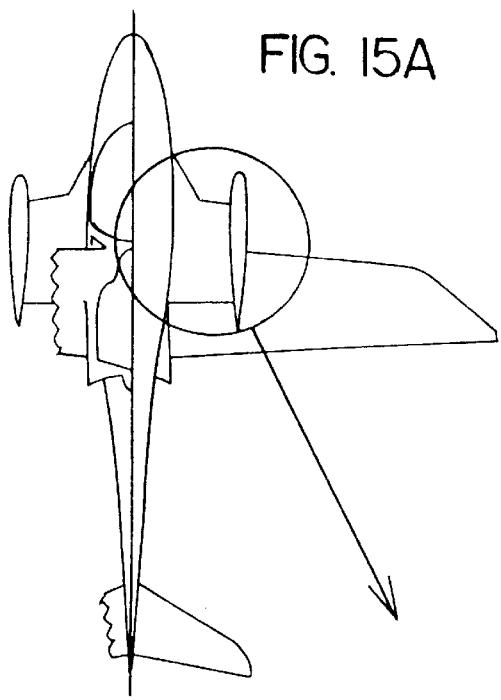
FIG. 15 is a plan view of one of the platforms, showing various dimension ranges.
Figure 15:
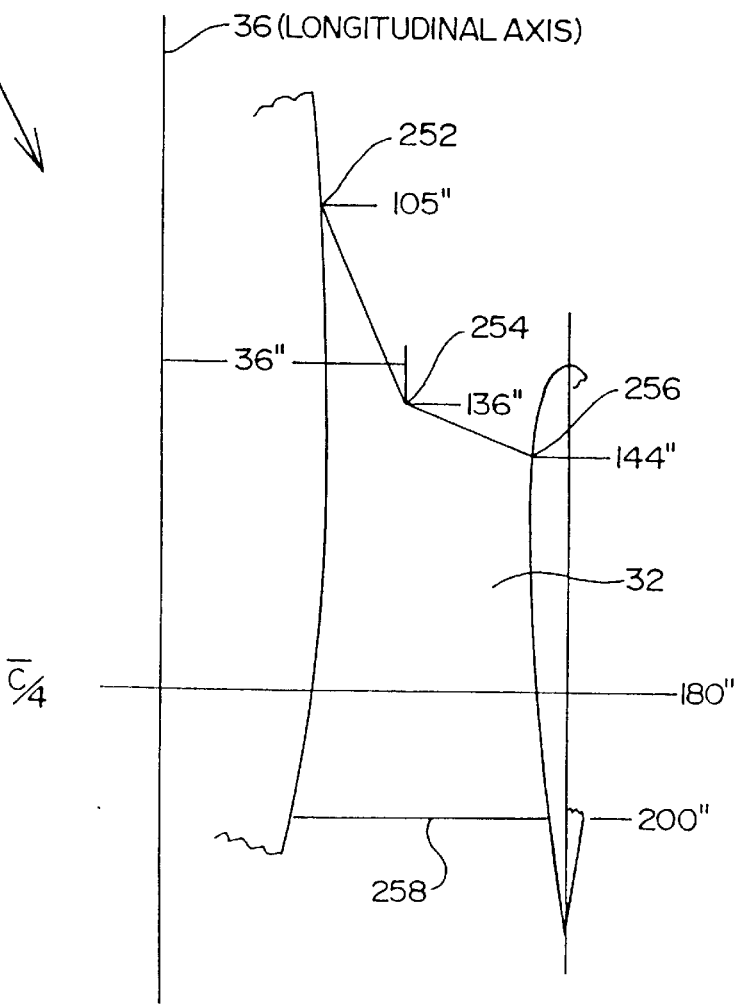

Reference is now made to FIG. 15 which shows schematically the right platform 32. The dimensions given relative to FIG. 15 are the result of further analysis which was done subsequent to arriving at the design dimensions shown in FIGS. 13 and 14. Therefore, the optimized dimensions in FIG. 15 differ to some extent from what is shown in FIG. 13.

In FIG. 15, there are shown four points, and the distance in inches from the zero reference point shown in FIG. 13 is given. (As FIG. 13 is actually shown, the zero reference point is not in the correct position, but should be positioned further away from the nose of the airplane. However, the locations of the foot dimensions in FIG. 13 are accurate.)

The point 252 is the most forward location of the strake 68, and is shown in FIG. 15, this is one hundred five inches rearwardly of the zero reference point which is the basis for the dimensions given in FIGS. 13 and 14. This point 252 as shown is one hundred sixty five percent forward of the quarter chord airplane reference line (indicated at the one hundred eighty inch line in FIG. 15.) It would certainly be possible (and in some respects desirable) to move this point 252 further forward. Present analysis indicates that the point 252 should be at least one hundred percent from the point 246, and it is possible it could desirably be as much as two hundred and fifty percent forward.

The point 254 is at the juncture line of leading edge of the strake 68 and the swept leading edge of the main platform 70. This is shown as being at the one hundred thirty six inch location, which would be ninety six percent forward of the point 246. In possible modifications of the design of the platform 32, this point could possibly be located fifty percent to one hundred fifty percent forward of the point 246.

The point 256 is indicated at the one hundred forty four inch location, and this is the point where the leading edge of the main body portion 70 of the platform 32 meets the pontoon 34. This is seventy five percent distant in front of the point 246. Within a broader range, this distance could be between twenty five percent to one hundred twenty five percent.

The rear trailing edge 258 of the platform 32 is at the two hundred inch line, and this is located at minus forty four percent from the point 246. With a broader range, this could be located from zero percent to minus one hundred percent rearwardly of the point 246.

As indicated previously, these ranges of the locations and dimensions of the various components are based upon current analysis, and wind tunnel testing, and yet further analysis in light of the wind tunnel testing would possibly expand these values somewhat beyond the ranges given above. Thus, quite possibly within the broader range of the present invention, the ranges given above could possibly be expanded by another fifty percent distance. Or such further analysis may indicate that the preferred ranges should be narrowed.

Reference is now made to FIGS. 16A, 16B and 16C. FIG. 16A in cross and the streamlines showing the air flow. The stagnation line is indicated at 262, and the streamlines 264 show the streamlines beneath the wing 16. As indicated earlier in this text, the forward portion 78 of the main portion 70 of the platform 34 has its upper surface indicated at 266 contoured to optimize the lift to drag ratio at cruise speed. The rear portion 80 of the main platform portion 70 has its upper surface 264 contoured so as to be largely "invisible" to the wing 14. Thus, the upper surface 268, should be contoured so as to match the streamlines as shown in FIG. 16A.

Figure 17A:
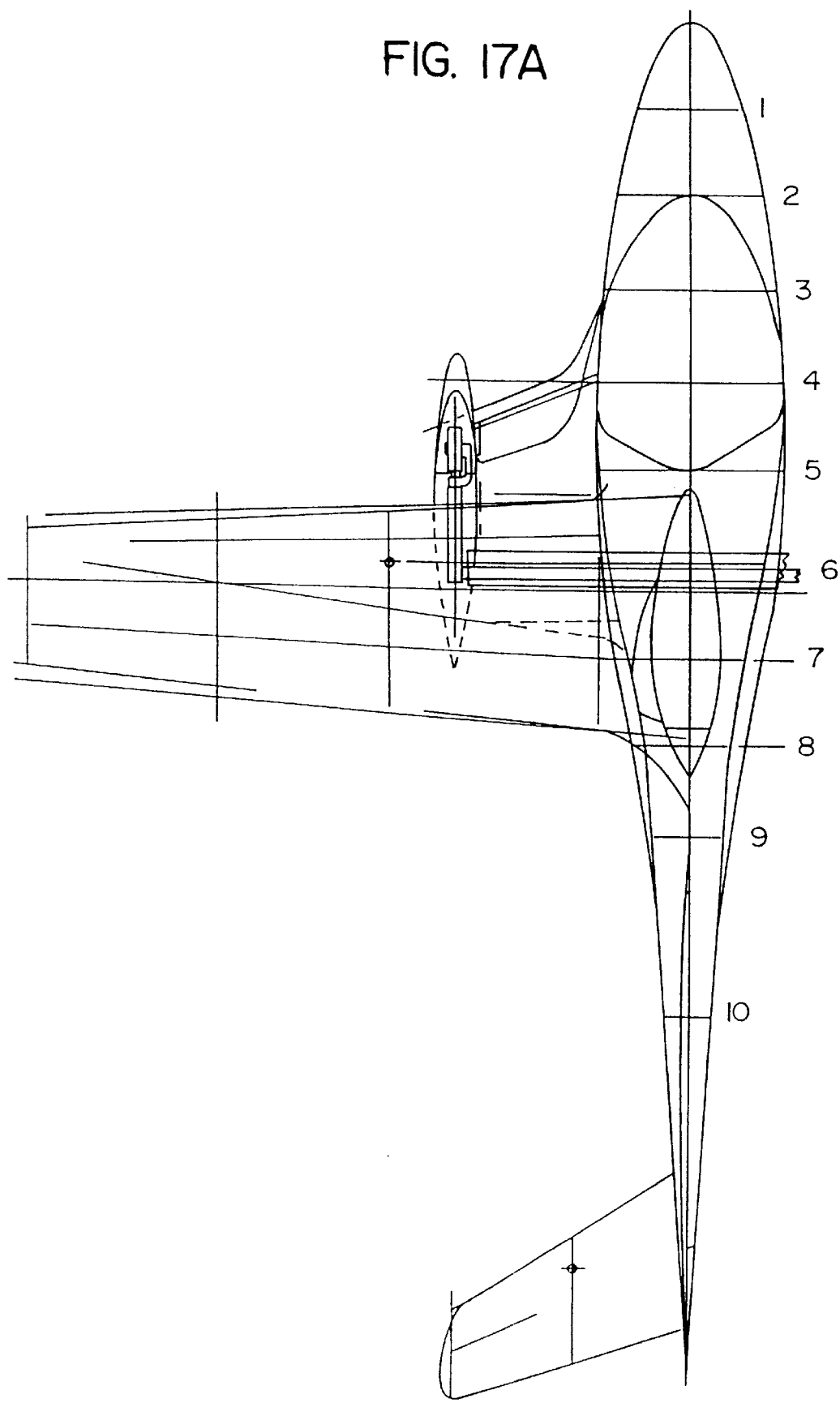
FIG. 17A is a top plan view of the airplane fuselage showing various transverse stations along the length of the fuselage.

Reference is now made to FIGS. 17A and 17B. In FIG. 17A, there is a plan view of the airplane fuselage 12, and ten stations are marked at transverse locations, these being numbered 1 through 10.

In FIG. 17B, the cross sections at each of the locations 1 through 10 of FIG. 17A are shown, with these bearing numerical designations 1 through 10 corresponding to those in FIG. 17A. These contours are drawn closely to scale. Attention is directed particularly to FIGS. 5 through 8, which show the upper aerodynamic lift augmenting surface 31 at four different locations.

It can be seen that at location 5, immediately after the canopy, the upper surface contour of the fuselage is beginning to flatten out. At station 6 which is at the approximate location of the main spar 130, the upper contour 31 is substantially flat. It can be seen that from station 6 through station 7 to station 8, the upper surface 31 is changing its contour, until at station 8, which is the location of the propeller, the concave curvature of the surface 31 is concentric with the curved path of the tip of the propeller 28.

The total arcuate length of the transverse section of the surface 31 at the location of the propeller 28 is, as shown herein, about 70°. Thus, at the outermost side locations of the surface 31 at the location of the propeller 28, there is still a substantial vertical lift component, but the horizontal lift component is starting to increase rapidly if the curve is continued upwardly. If the curvature would be carried for a full 90° on each side so that the total arcuate surface would be 180°, obviously the vertical lift component at the very outer surface areas would be totally zero, and more drag would be created since there is a greater surface area over which the airstream must flow. Present analysis has shown that the present location shown in FIG. 17B of the lift surface 31 at the station 8 represents a desirable balance of the tradeoffs in the design. Obviously, this arcuate distance could be modified, possibly increased or reduced 5° on each side, or even possibly as high as 10°, depending on the design criteria.

With regard to the longitudinal alignment of the lift augmenting surface 31, if this surface 31 is horizontally aligned, then the lift components would be vertical so that it would have no lateral force component. On the other hand, if the lift surface 31 slants downwardly and rearwardly, then the resultant lift force has not only a vertical lift component, but also a rearwardly directed lift component which would actually work against the thrust of the propeller, and would in fact increase drag. Present analysis indicates that if the surface of the lift force 31 starts to have a slope greater than one to fourteen in a rearward direction, and if we assume that the desired lift to drag ratio would be fourteen to one, then the net effect would be that the lift force created by that surface 31 would show no benefit, since the augmented lift would not increase the L/D. Accordingly, the present design philosophy is to keep the lift surface 31 close to horizontal alignment. Because of design trade-offs, it may become desirable to have a rather moderate downward slope in a rearward direction, but certainly no greater than one to fourteen (with one being the vertical component and fourteen being the lateral component).

It is obvious that various modifications could be made of the present invention without departing from the basis teachings thereof. For example, while the preferred embodiment of the present invention is in the form of a sea plane, and more specifically in this text an amphibious airplane, it is to be understood that this design of the present invention could also be adapted for an airplane which has no capability of landing on the water. In this instance, quite likely the two platforms 32 and the pontoons 34 would be eliminated. Also, it is to be recognized that the various design parameters could be varied, and because of interdependency, design compensations would have to be made in other areas. For example, by moving the center of lift of the lift augmenting surface 31 further rearwardly, this would increase the counterclockwise moment of the surface 31, which in turn would require the horizontal tail 20 to be able to exert a greater downward force to counterbalance this. On the other hand, if the design were such that the center of lift of the lift augmenting surface 31 were moved further forwardly, so it were closer to the center of gravity of the airplane, the moment of the lift augmenting force could be reduced to zero.

We claim:

1. An airplane comprising:
   a) a fuselage having a longitudinal axis, a vertical axis, and a lateral axis, perpendicular to said longitudinal and vertical axes;
   b) a main wing mounted to the fuselage and extending generally laterally therefrom as right and left wing sections
   c) an engine assembly mounted above said fuselage and spaced upwardly therefrom and having a propeller which defines a propeller area through which the propeller rotates, said propeller creating a rearwardly traveling propeller flow stream;
   d) a tail section located at a rear portion of the fuselage and having an aerodynamic surface an/or surfaces to create a vertically aligned aerodynamic force component, said tail section being located rearwardly of said propeller and in the propeller flow stream;
   e) a longitudinally extending aerodynamic lift augmenting airplane portion located over the fuselage and providing an upwardly facing aerodynamic lift augmenting surface longitudinally aligned with said propeller flow stream so that at least a portion of said propeller flow stream flows over said lift augmenting surface to create augmented lift;
   f) right and left platforms on opposite sides of said fuselage, each platform comprising a main platform portion and a strake having a highly swept leading edge extending from its related main platform portion forwardly along said fuselage.

2. The airplane as recited in claim 1, wherein each of said right and left platforms has a pontoon at a laterally outward location on each platform.

3. The airplane as recited in claim 1, wherein each of said platforms has a forward platform portion and a rear platform portion of said main platform portion, with the forward platform portion being positioned forwardly of a leading edge of the wing, and the rear platform portion being positioned longitudinally behind the leading edge of said wing.

4. The airplane as recited in claim 3, wherein at least the rear main platform portion of each of said platforms is aerodynamically contoured to alleviate possible aerodynamic interference with airstream flow around the main wing.

5. The airplane as recited in claim 3, wherein each of said strakes generates at higher angles of attack a vortex which travels over the main platform portion to create vortex generated lift, said wing being characterized in that at a predetermined angle of attack of the airplane, said wing reaches an initial stalling condition, each strake being aerodynamically arranged to continue generating a strong vortex flow over its main platform portion at said predetermined angle of attack to generate vortex induced lift to alleviate the effect of an initial stall condition of said main wing.

6. The airplane as recited in claim 1, wherein said airplane has an airplane reference mean aerodynamic chord (MAC) and also an airplane reference quarter chord (MAC) point, and components of the airplane have a percentage distance forwardly or rearwardly of said airplane reference quarter chord (MAC) point, with distance being measured as a percentage value where one hundred percent is the length of the airplane reference mean aerodynamic chord (MAC), each strake having a highly swept leading edge extending from its related main platform portion forwardly along said fuselage, a forward end of each of said strakes being about 100% to 250% forwardly of the airplane reference quarter chord (MAC) point and a forward leading edge portion of said main platform portion being between about 50% to 150% forwardly of said airplane reference quarter chord (MAC) point.

7. The airplane as recited in claim 6, wherein the trailing edge of each of said main platform portion is between about 0% to 100% rearwardly of the airplane reference quarter chord (MAC) point.

8. The airplane as recited in claim 4, wherein each of said strakes has its leading edge slanting rearwardly and outwardly at an angle from the longitudinal axis of the airplane no greater than about 30°.

9. The airplane as recited in claim 8, wherein said angle is between about 10° to 20°.

10. The airplane as recited in claim 1, wherein there is a main support structure positioned in said main fuselage portion, said engine assembly comprising an engine and engine support structure, said engine support structure being interconnected from said engine to said main support structure.

11. The airplane as recited in claim 10, wherein said airplane has passenger section is located forwardly of said main support structure, said main support structure having a box-like configuration having an open central area having a load carrying area within said main support structure rearwardly of said passenger section.

12. The airplane as recited in claim 10, wherein said wing is positioned longitudinally at said main support structure and is structurally interconnected with said main support structure.

13. The airplane as recited in claim 12 wherein said wing has a main spar extending through right and left wing sections of said wing and also through said main fuselage portion, said main spar being structurally connected to said main support structure.

14. The airplane as recited in claim 13, wherein said passenger section is located forwardly of said main support section, said passenger structure having a central location position forwardly of a center of gravity of said airplane, and said main support structure being positioned rearwardly of said center of gravity.

15. The airplane as recited in claim 14, wherein said passenger section comprises a forward passenger portion and a rear passenger portion, said forward passenger portion being positioned forward of said center of gravity, and said rear passenger portion being positioned approximately at said center of gravity.

16. The airplane as recited in claim 13, wherein said main support structure has a structural portion comprising side vertical support members, upper end portions of which are structurally connected to said main spar so that a central portion of said main spar functions as a structural support member with said structural support structure.

17. An airplane adapted to take off from and land on a water surface, said airplane comprising:

a) a fuselage having a longitudinal axis, a vertical axis, and a lateral axis, perpendicular to said longitudinal and vertical axes, said fuselage having lower water-engaging surfaces being positioned to engage the water surface and provide primary buoyancy force with the airplane in the water;

b) a main wing mounted to the fuselage and extending generally laterally therefrom as right and left wing sections c) an engine assembly mounted above said fuselage and spaced upwardly therefrom and having a propeller which defines a propeller area through which the propeller rotates, said propeller creating a rearwardly traveling propeller flow stream;

d) a tail section located at a rear portion of the fuselage and having an aerodynamic surface an/or surfaces to create a vertically aligned aerodynamic force component, said tail section being located rearwardly of said propeller and in the propeller flow stream;

e) a longitudinally extending aerodynamic lift augmenting airplane portion located over the fuselage and providing an upwardly facing aerodynamic lift augmenting surface longitudinally aligned with said propeller flow stream so that at least a portion of said propeller flow stream flows over said lift augmenting surface to create augmented lift;

f) said fuselage having a passenger section with an access location by which a pilot and/or a passenger can move into and from said passenger section, said airplane comprising substantially horizontally aligned platform section extending laterally from said fuselage adjacent to said access location;

g) said lift-augmenting surface having in transverse cross-section a concavely curved portion of said lift-augmenting surface, said propeller being located adjacent to said concavely curved portion, so that at least a portion of said propeller flow stream flows over said concavely curved portion to enhance augmented lift.

18. The airplane as recited in claim 17, wherein the platform section comprises eight and left platforms on opposite sides of the fuselage to provide access to the passenger section from both right and left sides.

19. The airplane as recited in claim 18, wherein there is main support structure positioned in said main fuselage portion, said engine assembly comprising an engine and engine support structure, said engine support structure being interconnected from said engine to said main support structure.

20. The airplane as recited in claim 19, wherein said wing is positioned longitudinally at said main support structure and is structurally interconnected with said main support structure.

21. The airplane as recited in claim 19, wherein said passenger section is located forwardly of said main support section, said passenger section a central location position forwardly of a center of gravity of said airplane, and said main support structure being positioned rearwardly of said center of gravity.

22. The airplane as recited in claim 21, wherein said passenger section comprises a forward passenger portion and a rear passenger portion, said forward passenger portion being positioned forward of said center of gravity, and said rear passenger portion being positioned approximately at said center of gravity.

23. The airplane as recited in claim 17, wherein said airplane further comprises a main support structure in said main fuselage portion, said wing having a main spar extending through said right and left wing sections and through said main fuselage portion, with said main spar being structurally connected to said main support structure.

24. The airplane as recited in claim 18, wherein each of said platforms has a forward platform portion and a rear platform portion, with the forward platform portion being positioned forwardly of a leading edge of the wing, and the rear platform portion being positioned longitudinally behind the leading edge of said wing.

* * * * *